United States Patent [19]

Takenouchi

[11] Patent Number: 5,184,310
[45] Date of Patent: Feb. 2, 1993

[54] SIGNAL GENERATION CIRCUIT

[75] Inventor: Norio Takenouchi, Tenri, Japan

[73] Assignee: Sharp Kabushiki Kaisha, Osaka, Japan

[21] Appl. No.: 501,857

[22] Filed: Mar. 30, 1990

[30] Foreign Application Priority Data

Mar. 31, 1989 [JP] Japan .................................. 1-82411
Mar. 1, 1990 [JP] Japan .................................. 2-51363

[51] Int. Cl.$^5$ .......................................... G06F 15/20
[52] U.S. Cl. .................................. 364/550; 318/811; 363/41; 364/150
[58] Field of Search ................. 318/696, 811; 363/41; 364/550, 150, 185

[56] References Cited

U.S. PATENT DOCUMENTS

| | | | |
|---|---|---|---|
| 4,001,700 | 1/1977 | Cook et al. ................. | 364/413.27 X |
| 4,145,644 | 3/1979 | Liu ..................................... | 318/696 |
| 4,337,429 | 6/1982 | Stuart ................................ | 318/811 |
| 4,467,254 | 8/1984 | Zucco, Jr. ......................... | 318/696 |
| 4,581,711 | 4/1986 | Hirata et al. ..................... | 364/550 |
| 4,638,643 | 1/1987 | Sakazume et al. .............. | 318/436 X |
| 4,723,201 | 2/1988 | Tanamachi et al. ............ | 363/41 |
| 4,961,130 | 10/1990 | Kirchberg, Jr. ................. | 363/41 |
| 5,021,726 | 6/1991 | Reinhardt et al. .............. | 318/811 |

Primary Examiner—Thomas G. Black
Assistant Examiner—Edward R. Cosimano

[57] ABSTRACT

Pulse wave modulation waveform signals of three-phase alternating-current necessary for driving a compressor used in an air-conditioner incorporating an inverter circuit are, for example, generated by preliminarily storing the reference waveform data in a ROM, reading out sequentially, and executing specified data conversion instructions. In a signal generation circuit of the invention, a waveform generation circuit for execution of such data conversion is provided independently of a central processing unit (CPU), and after setting initial data from the CPU, the waveform data are directly read into the waveform generation circuit from the ROM by DMA transfer system to perform data conversion. That is, the CPU is not related with the data conversion, and therefore it is not necessary to create waveform data reading program and data conversion program.

10 Claims, 16 Drawing Sheets

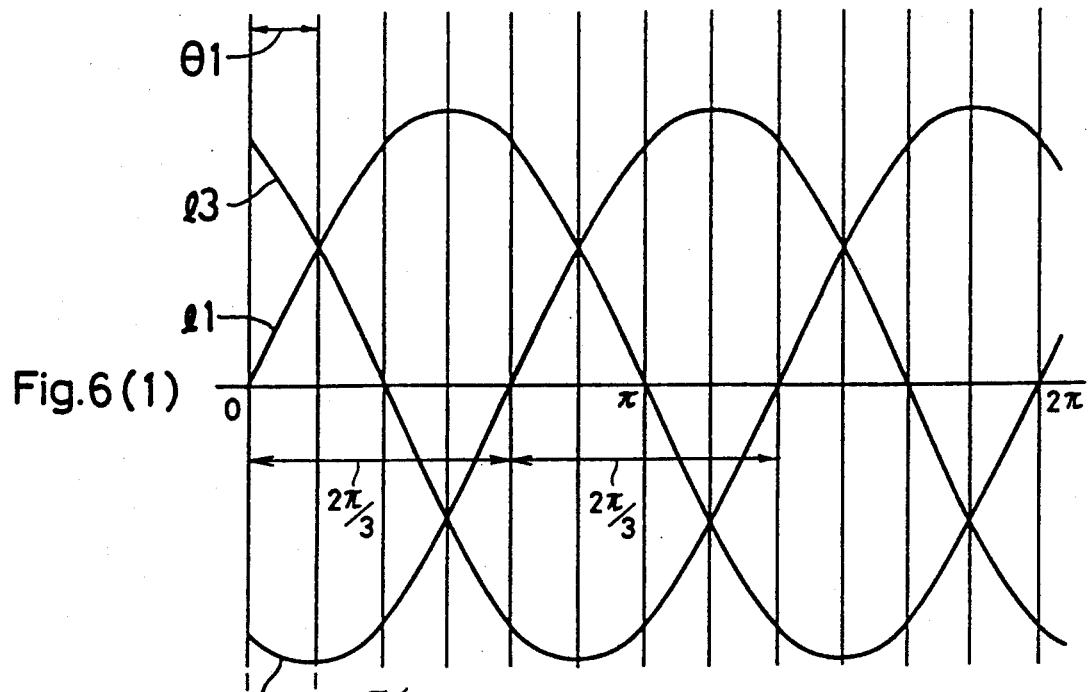
Fig.6 (1)
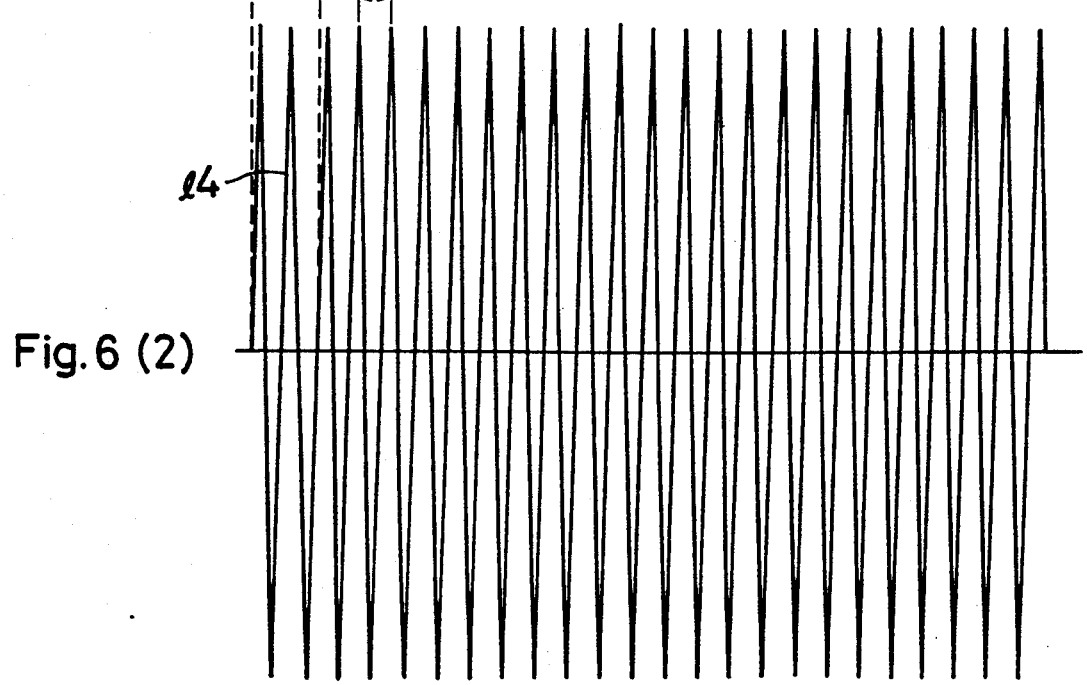
Fig.6 (2)

SIGNAL GENERATION CIRCUIT

BACKGROUND OF THE INVENTION

1. Field of the Invention

The present invention relates to a signal generation circuit for controlling the rotation of a motor such as a compressor or stepping motor, for example, in an air-conditioning system possessing an inverter circuit, using a pulse width modulation (PWM) signal.

2. Description of the prior Art

The voltage variable method, by transformer tap changeover or phase control, has been used for controlling the rotation of a stepping motor or three-phase alternating current motor, for example, in an air-conditioner. However, because of the problems of shortage of motor torque or generation of noise, the inverter method has been recently employed. In this method, a signal generation circuit is used consisting of one-chip microcomputer or the like, and the control signal is delivered from the signal generation circuit to control the direct-current-/alternating-current inverter, and the rotation is controlled smoothly by driving the motor with a frequency corresponding to a desired rotating speed.

FIG. 1 is a block diagram showing the hardware for controlling a compressor 12 using a signal generation circuit 1 of prior art. The signal generation circuit 1 comprises a register 4 connected by way of a data bus 2, a read-only memory (ROM) 5, a central processing unit (CPU) 3, an intenal timer 6, and a register 7 for input and output.

Operation program and waveform data of the signal generation circuit 1 are stored in the ROM 5. The CPU 3, according to the operation program, refers to the data stored in the register 4, and selectively reads out the waveform data from the ROM 5. Furthermore, on the basis of the data stored in the register 4, data conversion and other signal processing is done, and the signal is delivered to outside through the register 7 for input and output. At this time, an interruption signal generated by the internal timer 6 is given to the CPU 3 through a line 8, and the timing of the output signal is controlled by it.

The signal delivered from the signal generation circuit 1 is given to transistors T1 to T6 of an inverter 13 through a delay circuit 9 and a photocoupler 10. The delay circuit 9 is installed in consideration of the turn-off time in the transistors T1 to T6, and the photocoupler 10 is intended to prevent the incoming noise from entering the signal generation circuit 1. The transistors T1, T2, the transistors T3, T4, and the transistors T5, T6 are respectively connected in series, and supply voltages from a power supply circuit 11 are connected parallel to the collectors of the transistors T1, T3, T5. Output signal S1, S1 of the photocoupler 10 are respectively applied to the bases of the transistors T1, T2, output signals S2, S2 are applied to the bases of the transistors T3, T4, and output signals S3, S3 are applied to the bases of the transistors T5, T6. Signals at the connection junction of transistors T1, T2, at the connection junction of transistors T3, T4, and at the connection junction of transistors T5, T6 are given to the compressor 12 through lines 1a, 1b, 1c, respectively.

The compressor 12 is operated, for example, by a three-phase alternating-current motor, and may be equivalently expressed by coils 12a, 12b, 12c. The ends at one side of coils 12a to 12c are mutually connected, and the lines 1a to 1c are connected to the other ends of the coils 12a to 12c, respectively.

Thus, the direct-current output from the power supply circuit 11 is converted into a rectangular wave equivalent to three-phase alternating-current output by the inverter 13, and is applied to the coils 12a to 12c, so that the operating state in the compressor 12, that is, the rotating speed of the motor is controlled.

When controlling the operating state of the compressor 12 by using the signal generation circuit 1, it is necessary to prepare a program to be stored in the ROM 5 in order to operate the signal generation circuit 1. According to the program, all actions including reading of waveform data from the ROM 5 and conversion of waveform data are conducted, and therefore the program itself becomes huge, which may increase the load when writing software. Still more, the waveform of the output signal changes very slightly depending on the time for executing the subroutines of the program or the time for executing the commands included in the program (cycle time). Therefore, this signal generation circuit 1 cannot generate a signal possessing a pulse waveform of high precision.

SUMMARY OF THE INVENTION

It is hence a primary object of the invention to present a signal generation circuit capable of generating a signal possessing a pulse waveform of high precision, while notably alleviating the load in writing software.

To achieve the above object, the invention presents a signal generation circuit which comprises:

a memory in which waveform data relating to output signals are stored;

a central processing circuit for delivering initial data as the reference relating to the output data;

one or plural registers connected to the central processing circuit through data bus;

means for specifying an address of the memory on the basis of the initial data stored in the register; and means for processing signals to deliver signals to outside by processing the waveform data on the basis of the initial data stored in the register in response to the waveform data from the memory.

In a preferred embodiment of the invention, a memory for central processing circuit is provided, in relation to the central processing circuit, for storing operation program necessary for processing operations including output of the initial data to the register.

In an other preferred embodiment of the invention, the waveform data is stored in the memory according to the frequency of the output signals, and the kind of the waveform data is selected corresponding to the initial data set in the register by the central processing circuit.

In a different preferred embodiment, the registers include:

a start/end register for storing the initial data showing start address or end address of the memory of the waveform data;

a sample time setting register for storing the initial data for showing the time interval for reading out the waveform data from the memory;

a control register for storing the initial data for showing the kind to be selected of the waveform data; and plural counter registers for counting by storing the initial data relating to the number of times for reading out the waveform data.

In still another preferred embodiment of the invention, the signal generation circuit also comprises:

a direct-current power source; and an inverter circuit for converting the direct-current electric power from the direct-current power source into an alternating-current electric power, by responding to the signals delivered from the signal processing means.

According to the invention, the waveform data relating to output signals are stored in the memory, and the address specifying means specifies the address of the memory on the basis of the data stored in at least one register. The waveform data at the specified address is delivered to the signal processing means, and the waveform data is processed by the signal processing means, and a signal is delivered to an external circuit.

Therefore, in the present invention, since the waveform data in the memory is read out from the specified address by the address specifying means, the central processing circuit is not directly involved with memory addressing and a program for reading out the waveform data is not needed. Also, since the waveform data read out is processed by the signal processing means, a program relating to such signal processing is not necessary in the CPU. Moreover, the address specifying means and the signal processing means are provided independently of the central processing circuit, and the processing action can be executed at high speed, so that signals possessing pulse waveforms of high precision can be delivered.

Accordingly, the load in preparation of program can be greatly alleviated.

Furthermore, in order to achieve the above object, the invention also presents a signal generation circuit which comprises:

a central processing circuit for processing signals according to operation program;

one or plural registers connected to the central processing circuit through data bus, for storing initial data as the reference relating to output signals;

a memory in which the operation program and waveform data relating to the output signals are stored;

means for specifying address of the waveform data stored in the memory according to the initial data stored in the register;

means for processing signals to deliver signals to outside by processing the waveform data on the basis of the initial data stored in the register in response to the waveform data from the memory; and means for changing over the data bus between the central processing circuit and the memory, and the data bus between the signal processing means and the memory, corresponding to reading of the operation program from the memory into the central processing circuit, and reading of the waveform data from the memory to the signal processing means.

In a preferred embodiment of the invention, the changeover means changes over from the data bus between the central processing circuit and the memory, to the data bus between the signal processing means and the memory, corresponding to a bus changeover signal from the central processing circuit.

In a further preferred embodiment of the invention, the central processing circuit detects timing for specifying the address of the waveform data by the address specifying means, and delivers the bus changeover signal in response to the timing.

According to the invention, therefore, as mentioned above, the waveform data reading program and waveform data processing program are not needed. Also, using high speed processing, signals having pulse waveforms of high precision can be delivered.

Furthermore, since reading of waveform data out to the signal processing means is not associated with the central processing circuit, only when reading out the waveform data, for example according to the bus changeover signal, it is changed over by the changeover means from the bus line between the memory and central processing circuit, to the bus line between the memory and the signal processing means. Therefore, the waveform data and the operation program can be stored in the same memory, and the space occupancy by piggy-back or the like utilized in the development stage can be notably lessened, and the load in programming and adjustment of waveform data can be significantly alleviated.

BRIEF DESCRIPTION OF THE DRAWINGS

Other and further objects, features, and advantages of the invention will be more explicit from the following detailed description taken with reference to the drawings wherein:

FIG. 6(1) is a waveform diagram showing the waveform of the three-phase alternating current FIG. 6(2) is a waveform diagram showing the waveform of the triangular wave used in preparation of waveform data;

FIG. 13(1) shows the waveform data Da.

FIG. 13(2) shows the waveform data Ea.

FIG. 13(3) shows the waveform data $\overline{Ea}$.

FIG. 13(4) shows the output signal Fa.

FIG. 13(5) shows the output signal $\overline{Fa}$.

FIG. 13(6) shows the control signal Pa.

FIG. 13(7) shows the control signal $\overline{Pa}$.

FIG. 15 is a block diagram showing a practical structure of the signal generation circuit 21a.

DETAILED DESCRIPTION OF THE PREFERRED EMBODIMENTS

Figure 1:
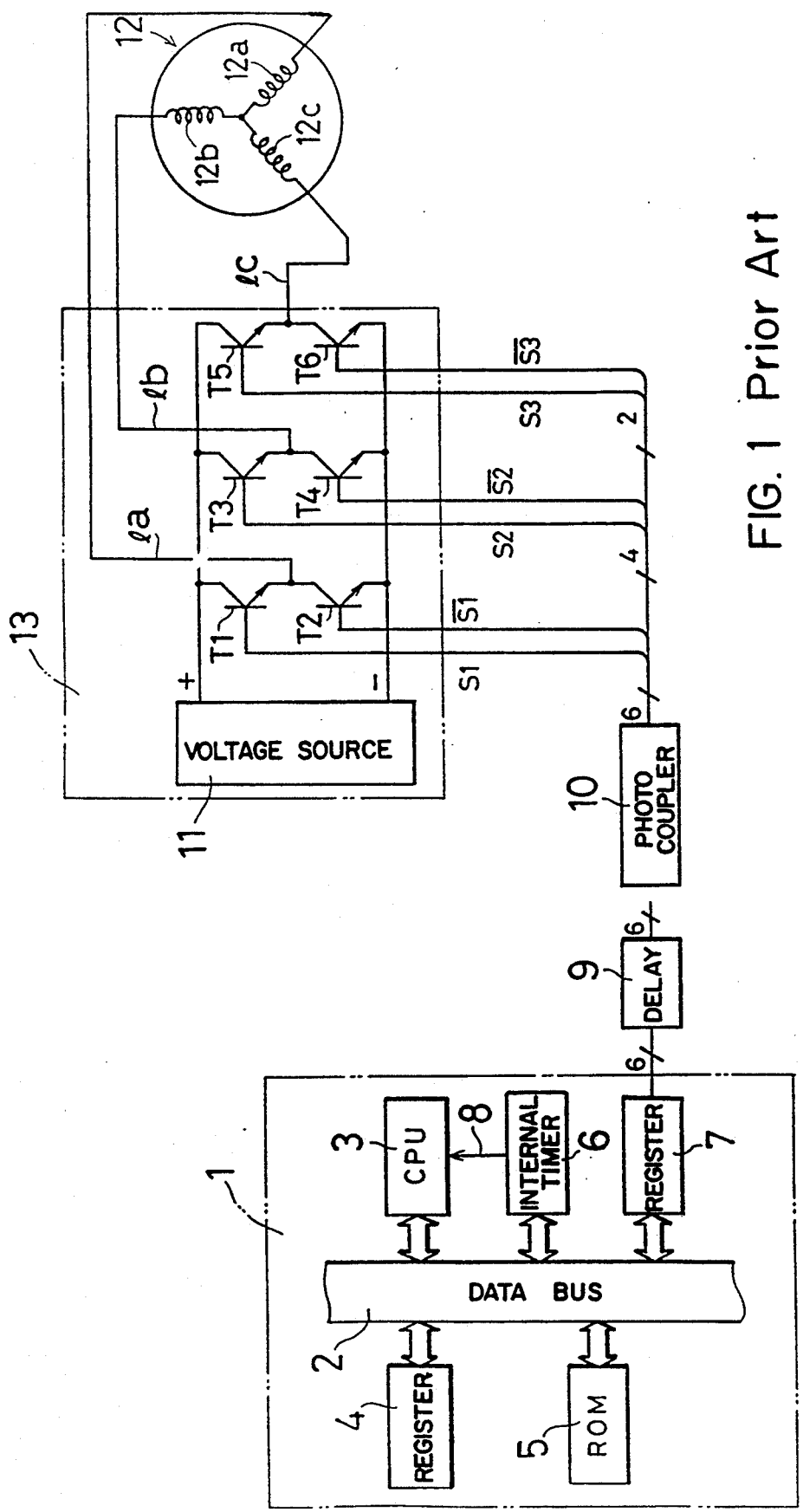
FIG. 1 is a block diagram showing the composition of a signal generation circuit 1 of prior art.

Now referring to the drawing, preferred embodiments of the invention are described below.

Figure 2:
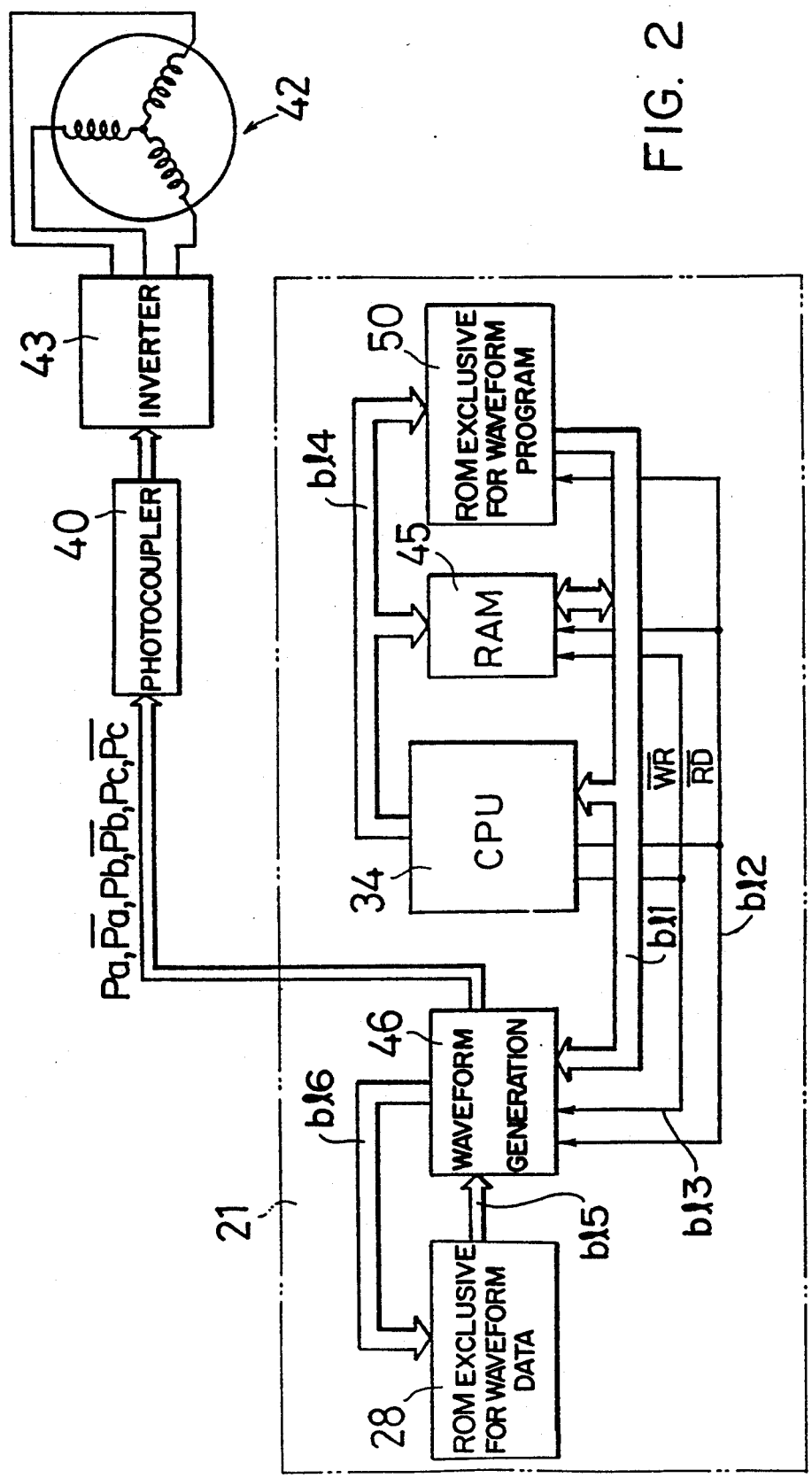
FIG. 2 is a block diagram showing a simplified composition of a signal generation circuit 21 as a first embodiment of the invention.
Figure 3:
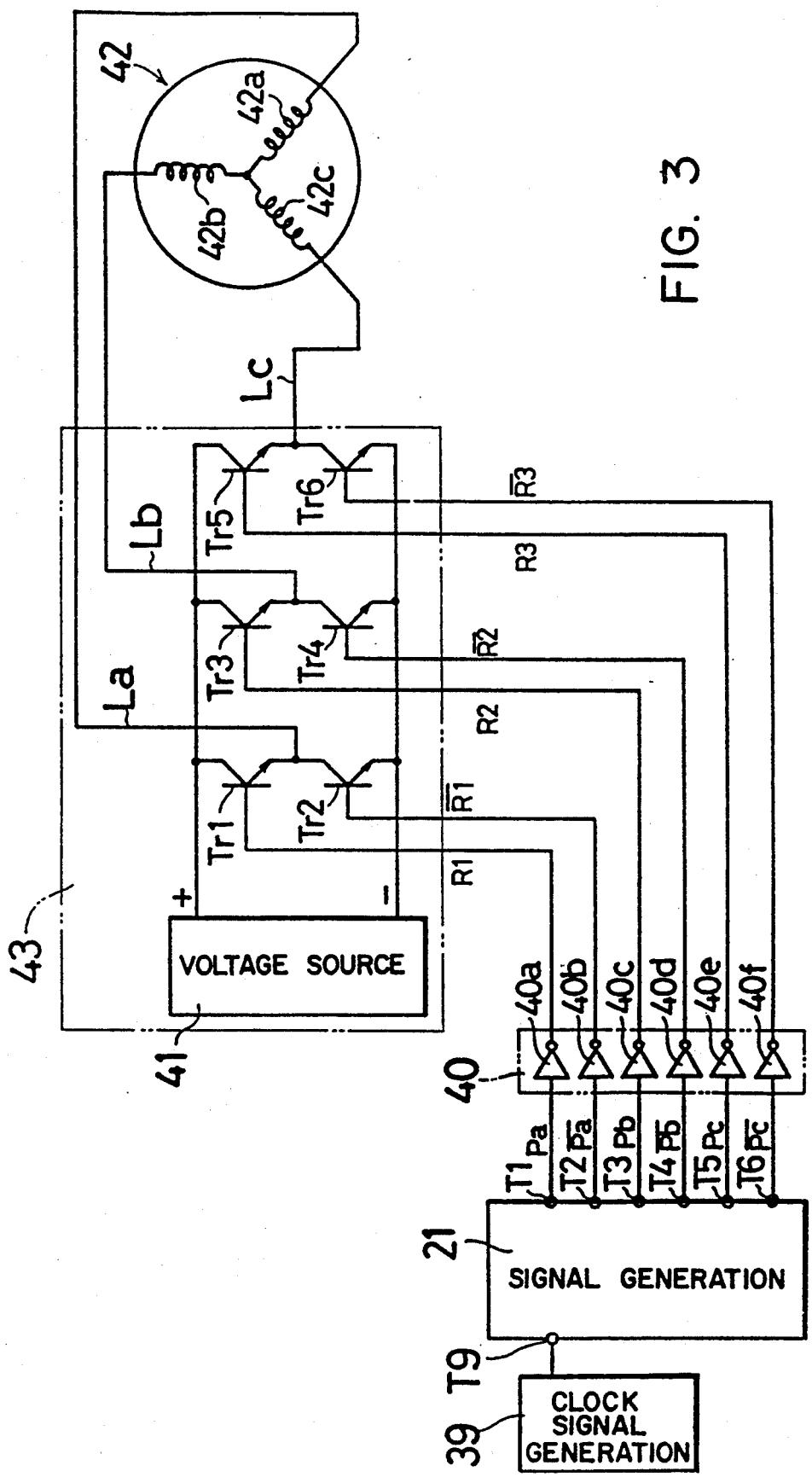
FIG. 3 is a block diagram showing the composition for controlling the operating state of a compressor 42 by the signal generation circuit 21.

FIG. 2 is a block diagram showing a simplified composition of a signal generation circuit 21 as a first embodiment of the invention, and FIG. 3 is a block diagram showing the composition for controlling the operating state of a compressor 42 by using the signal generation circuit 21. For example, control signal delivered from the signal generation circuit 21 of the embodiment is applied to an inverter 43, and the operation of the compressor 42, that is, the rotating speed of a motor which is the load, is controlled. The signal generation circuit 21 the inverter 43, and the photocouplers 40 are connected in order to suppress a disturbance such as noise.

The signal generation circuit 21 is composed of a central processing unit (CPU) 34 realized by a microcomputer or the like, a random access memory (RAM) 45, plural read-only memories (ROMs) 28, 50, and a waveform generation circuit 46. Within the waveform generation circuit 46 are contained plural registers, address specifying means 35 and signal processing means 36 as described later. In ROMs 28, 50, the operation program necessary for the operation of the CPU 34 are preliminarily stored in the ROM 50 which is exclusive for program information, while the waveform data relating to the three-phase alternating-current waveform (for example, 60 Hz) to be applied to the compressor 42 are preliminarily stored in the ROM 28, which is exclusive for waveform data. In the RAM 45, the rotating speed of the is set by an external controller which is not shown herein, temperature information from temperature sensor, and other data are written.

The individual blocks are mutually connected through data bus bl1 and control buses bl2, bl3. The CPU 34 commands read/write mode of each block through the control buses bl2, bl3, and specifies the address necessary for reading through address bus bl4. The operation program is read out from the ROM 50 which is exclusively for program information, and the data corresponding to the setting data read out from the RAM 45 are fed into the CPU 34 and waveform generation circuit 46, respectively, through the data bus bl1.

Between the waveform generation circuit 46 and the ROM 28 which is exclusively for waveform data, waveform data bus bl5 and address bus bl6 are connected, and the waveform data is selectively read out from the ROM 28 at a reading speed corresponding to the required rotating speed of the motor. The address necessary for reading is specified through the address bus bl6.

In the waveform generation circuit 46, according to the waveform data read out from the ROM 28 data conversion and other signal processing are done depending on initial data preset by the CPU 34. Further, the timing is controlled by an interruption signal from the internal timer not shown herein, and control signals Pa, $\overline{Pa}$, Pb, $\overline{Pb}$, Pc, $\overline{Pc}$ of each phase corresponding to the desired rotating speed of the motor are created.

Using these control signals the inverter 43 converts the supplied direct-current output into a rectangular wave equivalent to three-phase alternating current, and applies it to coils 42a to 42c of the compressor 42. Thus, the rotating speed of the motor is controlled.

In this embodiment, after the specified initial data is preliminarily sent from the CPU 34 to the waveform generation circuit 46, the waveform generation circuit 46 automatically executes the conversion of the specified data of the address, and the waveform data is read out from the ROM 28 and is delivered to the inverter 43 as control signals Pa to $\overline{Pc}$ after data conversion. That is, after setting the initial data, the CPU 34 is not related with the conversion processing of the waveform data. Therefore, no CPU program for address specification and waveform data conversion is necessary, and the load in program making is significantly alleviated. What is more, since the waveform is not changed due to the dependence of the command cycle time of the CPU 34 on the length of the subroutine of the program, signals of high precision can be delivered.

Referring hereinafter to FIG. 3, the elements for controlling the compressor 42 by the control signal from the signal generation circuit 21 are explained. A clock signal CK for operating the signal generation circuit 21 is applied from a clock signal generation circuit 39 through a terminal T9.

The signal delivered from the signal generation circuit 21 is applied to transistors Tr1 to Tr6 of the converter 43 through the photocouplers 40 as described above. The transistors Tr1, Tr2, the transistors Tr3, Tr4, and the transistors Tr5, Tr6 are respectively connected in series, and direct-current supply voltages from a power supply circuit 41 are applied parallel to the collectors of the transistors Tr1, Tr3, Tr5. Output signals R1, $\overline{R1}$ of the photocouplers 40 are applied to the bases of the transistors Tr1, Tr2, output signals R2, $\overline{R2}$ are applied to the bases of the transistors Tr3, Tr4, and output signals R3, $\overline{R3}$ are applied to the bases of the transistors, Tr5, Tr6, respectively. Signals at the connection junction of the transistors Tr1, Tr2, at the connection junction of the transistors Tr3, Tr4, and at the connection junction of the transistors Tr5, Tr6 are applied to the compressor 42 through lines La, Lb, Lc, respectively.

The compressor 42 is operated by, for example, a three-phase alternating-current motor, and it may be equivalently expressed by coils 42a, 42b, 42c. The ends at one side of the coils 42a to 42c are mutually connected, and the lines La to Lc are respectively connected to the other ends of the coils 42a to 42c.

Thus, the direct-current output from the power supply circuit 41 is converted into a rectangular wave equivalent to the three-phase alternating current by the inverter 43, and is applied to the coils 42a to 42c, so that the operating state in the compressor 42, that is the rotating speed of the motor is controlled.

Meanwhile, the photocouplers 40 are composed of, for example, photo diodes and photo transistors, and the output voltage is inverted from the input voltage by inverters 40a through 40f, and hence it is expressed by using the symbol of the inverter in FIG. 3.

A practical structure of the signal generation circuit 21 is explained below while referring to FIG. 4.

The signal generation circuit 21 comprises the address specifying means 35, the ROM 28 in which the waveform data is stored, the signal processing means 36, and plural registers. The plural registers are expressed by using the same reference code as the register name. These registers are connected to the CPU 34 through an address bus not shown herein and data bus 124. At a predetermined timing, the initial data F is set. The address of each register, and register name are shown in Table 1.

TABLE 1

| Address | Register name |
| --- | --- |
| FF20h | CONT |
| FF21h | STRT |
| FF22h | |
| FF23h | END |
| FF24h | |
| FF25h | SAMP |
| FF26h | |
| FF27h | CNT12 |
| FF28h | CNTFF |

The address specifying means 35 is composed of, for example, an AND circuit 22, an up-counter 23, an address signal generation circuit 24, a coincidence judging circuit 26, and a multiplexer 27. The clock signal CK of, for example, 4 MHz generated in the clock signal generation circuit 39 is applied to one input terminal of the AND circuit 22 by way of the terminal T9. Incidentally, the seventh bit of register CONT is a start flag, and the logic value of this seventh bit is given to the other input of the AND circuit 22.

In the up-counter 23 of, for example, 10-bit composition, the initial data F set in register SAMP is set as initial value, and counting is done by the output from the AND circuit 22. When this up-counter 23 overflows, a signal in a high state is applied to the address signal generation circuit 24. This address signal generation circuit 24 is, for example, a 13-bit up-down counter, and counting is done by the rise of the signal from the up-counter 23. The mode of operation of this counting is as described below according to the control signal from a decoder 29.

An initial value of the address signal generation circuit 24 is provided from the multiplexer 27. This multiplexer 27 selects the values stored in the register STRT and register END depending on the signal from the decoder 29 as described below, and delivers to the address signal generation circuit 24. The output from the multiplexer 27 is also given to the coincidence judging circuit 26. This coincidence judging circuit 26 compares the data output from the multiplexer 27 and the address data delivered from the address signal generation circuit 24, and when the both are matched, a signal in a high state, for example, is output.

The register CNT 12 is a counter for counting, for example, from 0 to 11, and performs counting according to the coincidence judging signal from the coincidence judging circuit 26. At this time, in the initial data F set in the register CONT, when the fourth bit is 0, the count-up number is preset by the sixth bit and the fifth bit of the register CONT. When the fourth bit of the register CONT is 1, the register CNT 12 is not used as counter, and an arbitrary value is set by the CPU 34.

The data stored in the register CNT 12 is decoded by the decoder 29, and according to this numerical value, the address specification mode in the address signal generation circuit 24, the lead-out data selection mode in the multiplexer 27, and the data conversion mode in a data conversion circuit 30 are determined.

Meanwhile, when the fourth bit of the register CONT is 0, that is, when the register CNT 12 is used as counter, if the register CNT 12 overflows, a signal in the high state is output on line 38 by way of a switch 25. When the fourth bit of the register CONT is 1, the signal from the coincidence judging circuit 26 is output to line 38 by the switch 25. The signal of line 38 is given to the CPU 34 as the interruption signal. When the fourth bit of the register CONT is 1, the desired numerical values are set to the third through zero-th bit of the register CNT 12 by the interruption processing of this interruption signal. Further, the signal of line 38 is also sent to register CNTFF which is a one-byte counter, and as a result the interruption signal is sent to the CPU 34 at every signal generation in 256 cycles. That is, the initial data F to the registers are updated by the interruption processing executed at the timing of these interruption signals, and the frequency of the electric power to be applied to the motor is changed smoothly, thereby realizing an optimum control.

The ROM 28 is a read-only memory in a composition of, for example, 8 kbytes×3 bits, and it delivers the 3-bit data of the address specified by the address data delivered from the address signal generation circuit 24 to the signal processing means 36 as the waveform data Da, Db, Dc.

The signal processing means 36 comprises the data conversion circuit 30, a rise delay circuit 31, and an output circuit 32. The waveform data Da, Db, Dc from the ROM 28 are sent to the data conversion circuit 30. The data conversion circuit 30 converts the data on the basis of the signal from the decoder 29, and provides signals Ea, $\overline{Ea}$, Eb, $\overline{Eb}$, Ec, $\overline{Ec}$ to the rise delay circuit 31. The rise delay circuit 31 delays the rise of these signals Ea to Ec, $\overline{Ea}$ to $\overline{Ec}$, by the delay time d determined by the third through the zero-th bit of the register CONT, and delivers them as signals Fa to Fc and $\overline{Fa}$ to $\overline{Fc}$ to the output circuit 32. The output circuit 32, on the basis of these signals Fa to Fc and $\overline{Fa}$ to $\overline{Fc}$, provides signals Pa to Pc, $\overline{Pa}$ to $\overline{Pc}$ for driving the compressor 42 at a suction current of 20 mA, in order to drive the photocouplers 40, through the terminals T1 to T6. Meanwhile, by sending out a stop signal to the latch circuit 33 through a terminal T7 from outside, the output circuit 32 may be stopped. This stop signal serves also as the interruption signal to the CPU 34.

Hereinafter, referring to the flowchart in FIG. 5, the operation of the signal generation circuit 21 is explained briefly. Prior to generation of signal for controlling the compressor 42 from the signal generation circuit 21, at step n1, the initial data F stored in the register groups in the signal generation circuit 21 are set. At next step n2, according to the initial data F stored in the registers, the address of the ROM 28 is specified by the address specifying means 35. As a result, at step n3, the waveform data Da, Db, Dc at that address are delivered, and are read out by the signal processing means 36.

At step n4, the signal processing means 36 processes the waveform data Da, Db, Dc, and delivers the results of signal processing as the control signals Pa to Pc and $\overline{Pa}$ to $\overline{Pc}$ at step n5.

Consequently, at step n6, it is judged whether the signal read out by the multiplexer 27 and the address data delivered from the address signal generation circuit 24 are matched or not. When not matched, the address data delivered from the address signal generation circuit 24 is increased or decreased, thereby returning to step n2, via step 14. When the decision at step n6 is affirmative, at step n7 the processing is branched by the logic value of the fourth bit of the register CONT. When the logic value is 0, at step n8 the counting action is effected by the register CNT 12. The count-up value at this time is set by the fifth bit and the sixth bit of the register CONT.

Further, at step n9, it is determined whether the counting value in the register CNT 12 is over the specified value, that is, 12 or not. When this decision is negative, the initial value of the address data delivered from the address signal generation circuit 24 is set again, thereby returning to step n2, via step 14. When the decision is affirmative, the operation advances to step n10 as described below.

At step n7, when the fourth bit value of the register CONT is 1, the interruption occurs at step n10, and the CPU 34 can set a desired value in the register CNT 12 within the interruption processing routine.

By this interruption signal, at step n11, the count-up action of the register CNTFF is effected, and the counting value of the register CNTFF is judged to be over the preset value of 256 or not at step n12. When this decision is negative, the address signal generated from the address signal generation circuit 24 is set again, thereby returning to step n2, via step 15. When this decision is affirmative, the operation advances to step n13, and the interruption signal is generated.

In this embodiment, the CPU 34 may be composed so as to perform specified interruption action such as updating of initial data F of each register by the input of the interruption signal.

Thus, from the signal processing means 36, the control signals Pa to Pc, $\overline{Pa}$ to $\overline{Pc}$ for controlling the operating state of the compressor 42 are delivered.

Each action in the signal generation circuit 21 is described in detail below.

(1) Setting of sampling time

In the signal generation circuit 21, the time interval for reading the waveform data Da to Dc from the ROM 28 (hereinafter called sampling time) may be varied on the basis of the initial data set in the register SAMP. The register SAMP comprises the memory region specified by the address number FF25h (here "h" denotes hexadecimal notation) and address number FF26h, and the meaning of each bit is as shown in Table 2.

TABLE 2

| Register name | Address | Bit | Description |
|---|---|---|---|
| SAMP | FF25h | 0 | Data expressing sampling time |
|  |  | 1 |  |
|  |  | 2 |  |
|  |  | 3 |  |
|  |  | 4 |  |
|  |  | 5 |  |
|  |  | 6 |  |
|  |  | 7 |  |
|  | FF26h | 0 |  |
|  |  | 1 |  |
|  |  | 2 |  |
|  |  | 3 |  |
|  |  | 4 |  |
|  |  | 5 |  |
|  |  | 6 |  |
|  |  | 7 | Up-counter set flag |

That is, the address number FF25h represents the lower 8 bits of the data expressing the sampling time, and the lower 2 bits of the address number FF26h show the upper 2 bits of the data expressing the sampling time. Therefore, the data expressing the sampling time may have any value from 00h to 3FFh. This value becomes the initial value of the up-counter 23.

Since the up-counter 23 counts by the clock signal of maximum 4 MHz, the sampling time may be selected from 256 μsec to 0.25 μsec, corresponding to 00h to 3FFh, at 0.25 μsec intervals. When the data expressing the sampling time is 00h, the sampling time is 256 μsec.

The seventh bit of the address number FF26h is an up-counter set flag, and when the logic value "1" is set, the data expressing the sampling time is set as the initial value in the up-counter 23. After being set as initial value, the up-counter set flag becomes 0.

(2) Making of waveform data

At every rise of the signal from the up-counter 23, the address signal generation circuit 24 delivers the address data to the ROM 28. The waveform data to be stored in the ROM 28 is prepared as described below, and is stored.

The three-phase alternating-current waveform necessary for driving the three-phase alternating-current motor consists of sine waves 11 to 1, each out of phases by $2\pi/3$ (=120°) as shown in FIG. 6 (1), and by varying the frequency, the rotating speed of the motor is controlled. The variable range of the frequency is, for example, from 20 to 180 Hz. The waveform data Da to Dc are determined by sampling the triangular wave 14 of the cycle of $2\pi/n$ (n is an integer, and n=24 in FIG. 6 (2)) shown in FIG. 6 (2) by the pulse width modulation (PWM) by the sine waves 11 to 13.

Figure 7:
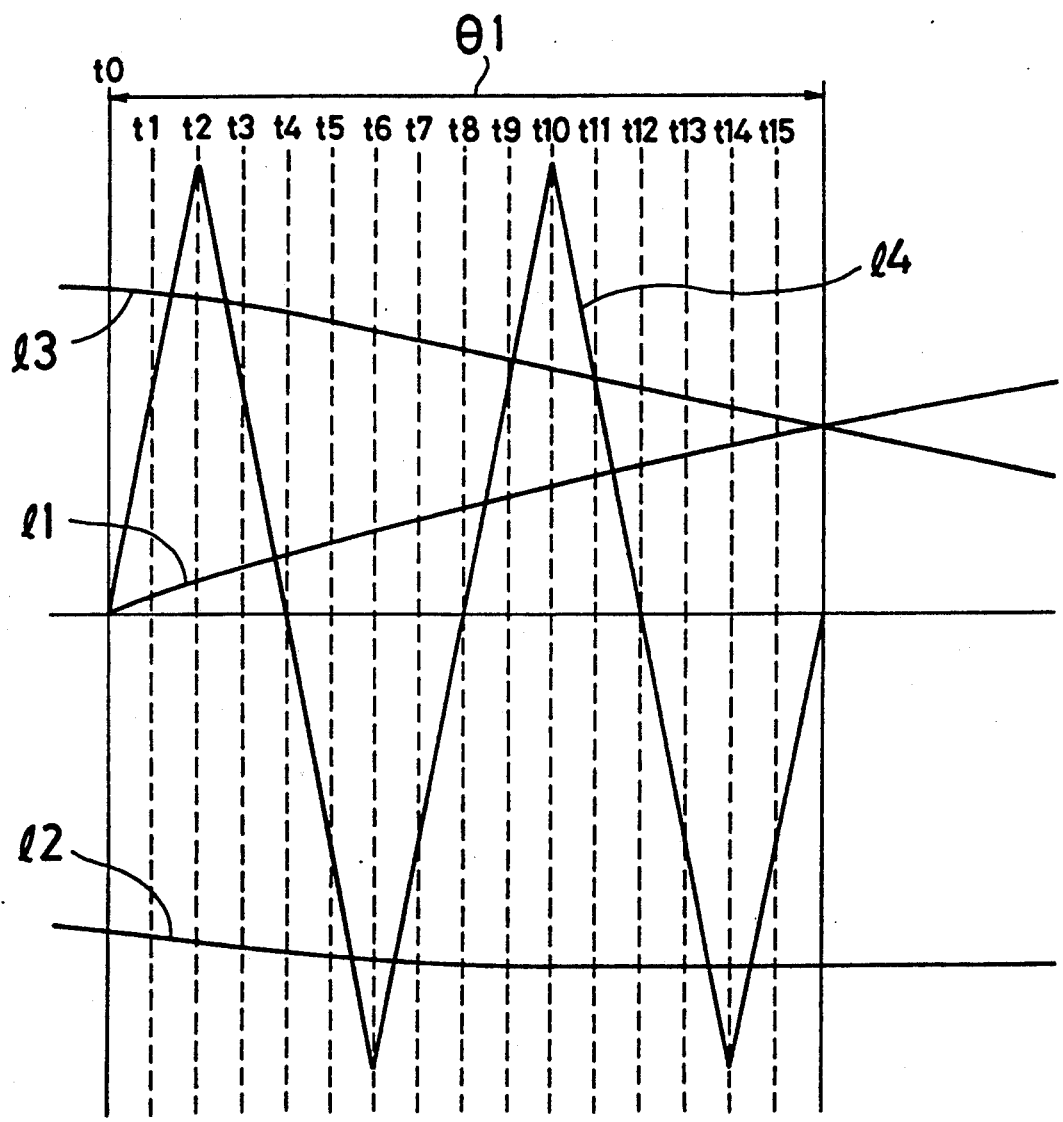
FIG. 7 is a waveform diagram showing a magnified view of the portion of time $\theta 1$ of FIG. 6.

In FIG. 7, as an example, for explaining the generation of waveform data Da to Dc for the portion of 30 degrees indicated by time $\theta1$ in FIG. 6, a waveform diagram for showing the three-phase alternating-current waveform at time $\theta1$ is presented.

Specifically, the time $\theta1$ is further divided, for example, into 16 so as to be corresponding to 16 bits, and the sine waves 11 to 13 and the triangular wave 14 at each time of t0 to t15 are compared in size. By the comparison between the sine wave 11 and triangular wave 14, the waveform data Da is composed, by the comparison between the sine wave 12 and triangular wave 14, the waveform data Db is composed, and by the comparison between the sine wave 13 and triangular wave 14, the waveform data Dc is composed. That is, at each time of t0 to t15, when the values of the sine waves 11 to 13 are below the value of the triangular wave 14, the logic value of the waveform data is 0, and when the values of the sine waves 11 to 13 are over the value of the triangular wave 14, the logic value of the waveform data becomes 1. Thus composed waveform data Da to Dc for the portion of 30 degrees are shown in Table 3. Meanwhile, depending on the number of divisions, the bit length of the data increases or decreases, and the sampling precision is determined by the period of the triangular wave 14 to be subjected to pulse modulation. Therefore, the precision is higher when the period of the triangular wave 14 is shorter and the number of divisions is larger.

TABLE 3

|    | t0 | t1 | t2 | t3 | t4 | t5 | t6 | t7 | t8 | t9 | t10 | t11 | t12 | t13 | t14 | t15 |
|----|----|----|----|----|----|----|----|----|----|----|-----|-----|-----|-----|-----|-----|
| Da | 0  | 0  | 0  | 0  | 1  | 1  | 1  | 1  | 1  | 0  | 0   | 0   | 1   | 1   | 1   | 1   |
| Db | 0  | 0  | 0  | 0  | 0  | 0  | 1  | 0  | 0  | 0  | 0   | 0   | 0   | 0   | 1   | 0   |
| Dc | 1  | 1  | 0  | 1  | 1  | 1  | 1  | 1  | 1  | 1  | 0   | 0   | 1   | 1   | 1   | 1   |

When generating signals for one cycle from the waveform data of 30 degrees portion as mentioned below, the data conversion as stated later is applied to the waveform data of 30 degrees by the data conversion circuit 30, and the waveform data for one cycle is obtained. For example, from the waveform data Da for 30 degrees shown in Table 3, the waveform data as shown in Table 4 is compiled by data conversion.

TABLE 4

|      | t0 | t1 | t2 | t3 | t4 | t5 | t6 | t7 | t8 | t9 | t10 | t11 | t12 | t13 | t14 | t15 |
|------|----|----|----|----|----|----|----|----|----|----|-----|-----|-----|-----|-----|-----|
| −Da  | 1  | 1  | 1  | 1  | 0  | 0  | 0  | 1  | 1  | 1  | 1   | 1   | 0   | 0   | 0   | 0   |
| $\overline{Da}$ | 1 | 1 | 1 | 1 | 0 | 0 | 0 | 0 | 0 | 1 | 1 | 1 | 0 | 0 | 0 | 0 |
| −$\overline{Da}$ | 0 | 0 | 0 | 0 | 1 | 1 | 1 | 0 | 0 | 0 | 0 | 0 | 1 | 1 | 1 | 1 |

In Table 4, the waveform data (−Da) is set up by reversely arranging the logic values arranged in the time series of the waveform data Da, and it is obtained by updating and specifying the address specifying direction in the reverse direction. The waveform data $\overline{Da}$ is obtained by inverting the waveform data Da. Therefore, the waveform data (−$\overline{Da}$) is an inverted form of the waveform data (−Da).

(3) Conversion of waveform data

The waveform data Da to Dc delivered from the ROM 28 are converted in plural forms by the initial data F set in the registers CONT, CNT 12. The content of the register CONT is shown in Table 5.

TABLE 5

| Register name | Address | Bit | Description |
|---------------|---------|-----|-------------|
| CONT          | FF20h   | 0   | Data expressing sampling |
|               |         | 1   | time |
|               |         | 2   |      |
|               |         | 3   |      |
|               |         | 4   | Selection flag |
|               |         | 5   | Kind of waveform data |
|               |         | 6   | stored in ROM 28 |
|               |         | 7   | Start flag |

The zero-th bit through third bit of register CONT are used for setting the delay time d as described below. The fourth bit is a selection flag for selecting whether the register CNT 12 is used as counter or not, as mentioned earlier.

The fifth bit and the sixth bit are provided for selecting the kind of waveform data. The seventh bit is the start flag, and when the logic value is 0, the output of the signal from the signal generation circuit 21 is stopped. When the start flag is changed from 0 to 1, the register CNT 12 and the register CNTFF as mentioned below are set in the initial value of 0, while the highest position bits of the registers STRT, END, SAMP as mentioned above are reset.

The third bit through the zero-th bit of the register CNT 12 are provided for setting the conversion modes of the waveform data, and when the fourth bit of the register CONT is 1, an arbitrary numerical value (0 to 11) can be set from the CPU 34. The relation between the values of the third bit through the zero-th bit of the register CNT 12 and the data conversion modes is shown below in Table 7.

When the fourth bit of the register CONT is 0, the third bit through the zero-th bit of the register CNT 12 are used as the counter. The relation between the values of the sixth bit and the fifth bit of the register CONT and the count-up value in the register CNT 12 is shown in Table 6.

TABLE 6

| Register CONT | | Count-up number of |
|---|---|---|
| 6th bit | 5th bit | register CNT 12 |
| 0 | 0 | +1 |
| 0 | 1 | +2 |
| 1 | 0 | +4 |

The conversion of waveform data Da to Dc is described in detail below for every numerical value of the sixth bit to the fourth bit of the register CONT.

(a) When the sixth bit to the fourth bit of the register CONT are 000:

When the sixth bit to the fourth bit of the register CONT are 000, the output signals for one cycle are generated from the waveform data of the 30-degree portion. At this time, in the register CNT 12, the count-up number is set at +1, and the counting action is done sequentially from 0 to 11 by the count-up number of +1. As a result, the waveform data Da to Dc of 30 degrees portion are read out 12 times, in one cycle, from the angle θa1 to θa12 in FIG. 8.

From the decoder 29 to the address signal generation circuit 24 and multiplexer 27, signals are read out on the basis of the zero-th bit of the register CNT 12. Therefore, when the zero-th bit of the register CNT 12 is 0, the multiplexer 27 first reads out the numerical value stored in the register STRT. In consequence, the initial value of the address signal generation circuit 24 becomes the initial data F to be stored in the register STRT. Besides, the address signal generation circuit 24 functions as up-counter by the signal from the decoder 29, and the address values are sequentially specified while increasing. At this time, the multiplexer 27 is changed over to read out the register END, and at the coincidence judging circuit 26, the address data from the address signal generation circuit 24 and the initial data F stored in the register END are compared. In this case, for example, when the address is specified 16 times by the address signal generation circuit 24, the output of the coincidence judging circuit 26 is changed, for example, to a high level.

When the zero-th bit of the register CNT 12 is 1, the multiplexer 27 first reads out the initial data F stored in the register END to the address signal generation circuit 24. In this case, according to the control signal from the decoder 29, the address signal generation circuit 24 functions as down-counter. When the address is specified 16 times by the address signal generation circuit 24, the initial data F of the register STRT being led out after being changed over from the multiplexer 27 and the address data from the address signal generation circuit 24 are matched, and the output of the coincidence judging circuit 26 becomes high.

Thus, in the waveform data Da to Dc delivered from the ROM 28, data conversion is performed by the data conversion circuit 30. That is, from the decoder 29, the data of the third bit through the zero-th bit of the register CNT 12 are read out, and accordingly the data is converted as mentioned above. The conversion modes in the data conversion circuit 30 are shown in Table 7.

TABLE 7

| Angle | $\theta a1$ | $\theta a2$ | $\theta a3$ | $\theta a4$ | $\theta a5$ | $\theta a6$ | $\theta a7$ | $\theta a8$ | $\theta a9$ | $\theta a10$ | $\theta a11$ | $\theta a12$ |
|---|---|---|---|---|---|---|---|---|---|---|---|---|
| Address specifying direction | Normal | Reverse | Normal | Reverse | Normal | Reverse | Normal | Reverse | Normal | Reverse | Normal | Reverse |
| Waveform data | | | | | | | | | | | | |
| Ea | Da | Dc | $\overline{Db}$ | $\overline{Db}$ | Dc | Da | $\overline{Da}$ | $\overline{Dc}$ | Db | Db | $\overline{Dc}$ | $\overline{Da}$ |
| Eb | Db | Db | $\overline{Dc}$ | $\overline{Da}$ | Da | Dc | $\overline{Db}$ | $\overline{Db}$ | Dc | Da | $\overline{Da}$ | $\overline{Dc}$ |
| Ec | Dc | Da | $\overline{Da}$ | $\overline{Dc}$ | Db | Db | $\overline{Dc}$ | $\overline{Da}$ | Da | Dc | $\overline{Db}$ | $\overline{Db}$ |
| CNT12 | 0h | 1h | 2h | 3h | 4h | 5h | 6h | 7h | 8h | 9h | Ah | Bh |

For example, at angle $\theta a1$, since the value stored in the register CTN 12 is 0, the waveform data Da to Dc are directly delivered as waveform data Ea to Ec. The waveform data $\overline{Ea}$ to $\overline{Ec}$ are inverted data of the waveform data Ea to Ec, respectively. At angle $\theta a2$, since the value of the register CNT 12 is 1, the waveform data Dc is delivered as the waveform data Ea, and the waveform data Db is delivered as the waveform data Eb, and the waveform data Da is delivered as the waveform data Ec.

Thus, at angles $\theta a1$ to $\theta a12$, as shown in Table 7, the data conversion circuit 30 converts and reads out the waveform data Da to Dc and the waveform data $\overline{Da}$ to $\overline{Dc}$ into the waveform data Ea to Ec and the waveform data $\overline{Ea}$ to $\overline{Ec}$ in different modes according to the data from the decoder 29.

In this way the waveform data Ea to Ec, $\overline{Ea}$ to $\overline{Ec}$ for the portion of one cycle are created from the waveform data Da to Dc for the portion of 30 degrees by the data conversion circuit 30.

Figure 8:
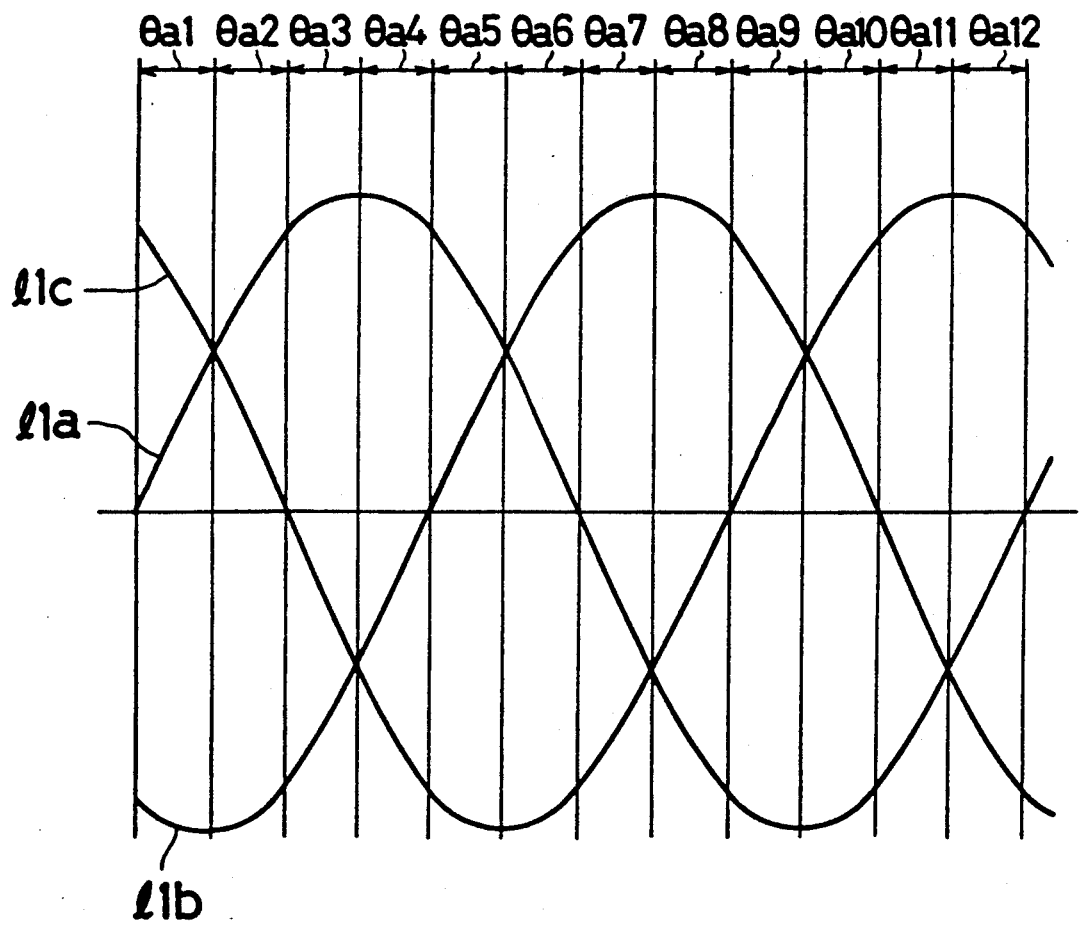
FIG. 8 is a waveform diagram of three-phase alternating current for explaining the conversion action of signal for generating signals for the portion of one cycle from the waveform data of 30-degree portion.

Therefore, in the coils 42a to 42c of the compressor 42 operated according to the waveform data Ea to Ec, a voltage drop close to the sine waves 11a to 11c composing the three-phase alternating current shown in FIG. 8 is generated. In FIG. 8, meanwhile, the sine waves 11a to 11c individually correspond to the waveform data Ea to Ec.

That is, as shown in Table 4, when at least three kinds of waveform data Da to Dc are stored in the ROM 28, the three-phase alternating-current waveform necessary for driving the motor may be easily demodulated. By varying the sampling speed of the waveform data Da to Dc from the ROM 28, it is possible to cope with the required rotating speed of the motor easily.

(b) When the sixth bit to the fourth bit of register CONT are 010:

In the case that the sixth bit to the fourth bit of the register CONT are 010, the output signals for the portion of one cycle are generated from the waveform data of the 60-degree portion. At this time, in the register CNT 12, the count-up number is set at +2, and the counting is sequentially effected from 0 to 10 by the count-up number of +2. Consequently, the waveform data Da to Dc of the 60-degree portion are read out six times in one cycle from angle $\theta b1$ to $\theta b6$ in FIG. 9. Therefore, the numerical value of the register CNT 12 is always even, and since the zero-th bit is 0, the multiplexer 27 first leads out the initial data F stored in the register STRT. As a result, the initial value of the address signal generation circuit 24 becomes the initial data F stored in the register STRT. The address signal generation circuit 24 functions as the up-counter by the signal from the decoder 29, and the address values are sequentially specified while increasing. At this time, the multiplexer 27 is changed over to lead out the register END, and the address data from the address signal generation circuit 24 and the initial data F stored in the register END are compared in the coincidence judging circuit 26. In this case, by the address signal generation circuit 24, when the addresses are specified for the portion of 32 times for time division at the each angle $\theta b1$ to $\theta b6$, for example, the output of the coincidence judging circuit 26 is changed, for example, to a high level.

Thus, data conversion is applied to the waveform data Da to Dc retrieved from the ROM 28 by the data conversion circuit 30. That is, from the decoder 29, the data of the third bit through the zero-th bit of the register CNT 12 are read out, and the data conversion is effected accordingly as mentioned above. The conversion modes in the data conversion circuit 30 are as shown in Table 8.

TABLE 8

| Angle | $\theta b1$ | $\theta b2$ | $\theta b3$ | $\theta b4$ | $\theta b5$ | $\theta b6$ |
|---|---|---|---|---|---|---|
| Address specifying direction | Normal | Normal | Normal | Normal | Normal | Normal |
| Waveform data | | | | | | |
| Ea | Da | $\overline{Db}$ | Dc | $\overline{Da}$ | Db | $\overline{Dc}$ |
| Eb | Db | $\overline{Dc}$ | Da | $\overline{Db}$ | Dc | $\overline{Da}$ |
| Ec | Dc | $\overline{Da}$ | Db | $\overline{Dc}$ | Da | $\overline{Db}$ |
| CNT12 | 0h | 2h | 4h | h6 | 8h | Ah |

For example, at angle $\theta b1$, since the value stored in the register CNT 12 is 0, the waveform data Da to Dc are delivered directly as waveform data Ea to Ec. The waveform data $\overline{Ea}$ to $\overline{Ec}$ are inverted forms of the waveform data Ea to Ec, respectively. At angle $\theta b2$, since the value of the register CNT 12 is 2, the waveform data $\overline{Db}$ is delivered as the waveform data Ea, the waveform data $\overline{Dc}$ as the waveform data Eb, and the waveform data $\overline{Da}$ as the waveform data Ec.

Thus, at angles $\theta b1$ to $\theta b6$, as shown in Table 8, the data conversion circuit 30 leads out the waveform data Da to Dc and the waveform data $\overline{Da}$ to $\overline{Dc}$ as the waveform data Ea to Ec and the waveform data $\overline{Ea}$ to $\overline{Ec}$ in different modes depending on the data from the decoder 29.

In this way, from the waveform data Da to Dc for the portion of 60 degrees, the waveform data Ea to Ec, $\overline{Ea}$ to $\overline{Ec}$ for the portion of one cycle are created by the data conversion by the data conversion circuit 30.

Figure 9:
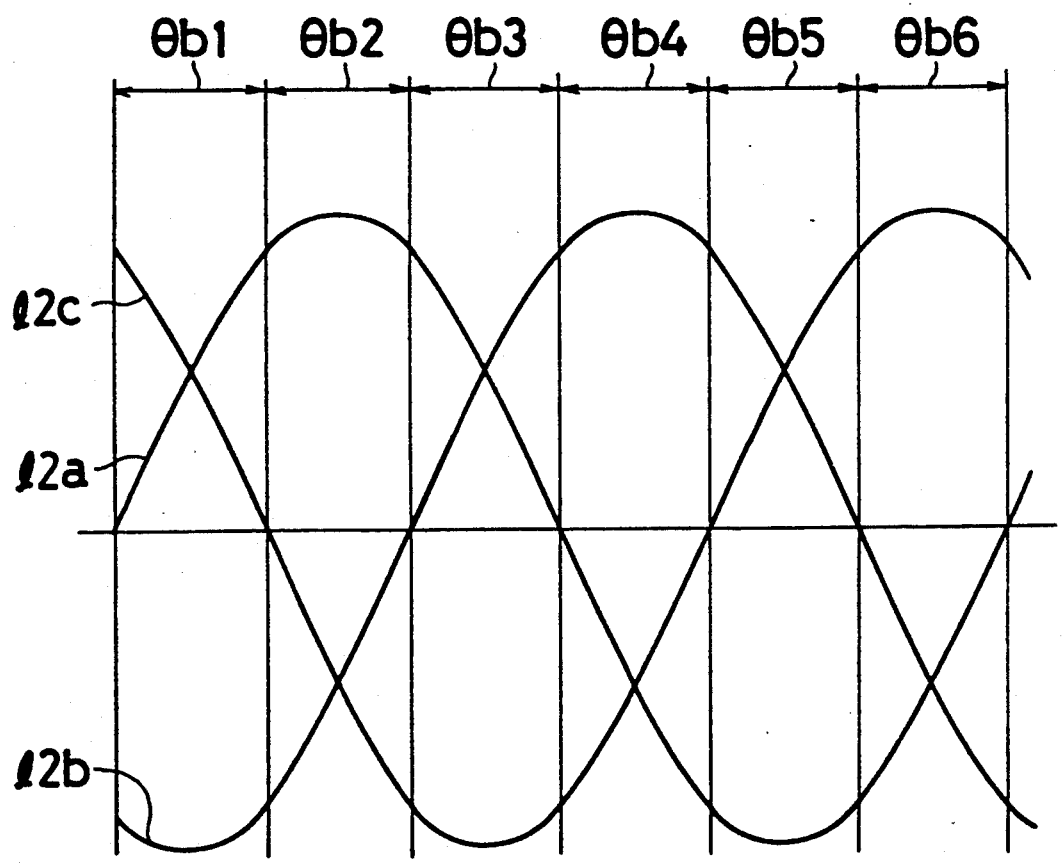
FIG. 9 is a waveform diagram of three-phase alternating current for explaining the conversion action of signal for generating signals for the portion of one cycle from the waveform data of 60-degree portion.

Therefore, in the coils 42a to 42c of the compressor 42 operated according to the waveform data Ea to Ec, a voltage drop close to the sine waves 12a to 12c for composing the three-phase alternating current shown in FIG. 9 is generated. In FIG. 9, meanwhile, the sine waves 12a to 12c correspond individually to the waveform data Ea to Ec.

(c) When the sixth bit to the fourth bit of register CONT are 100:

In the case that the sixth bit to the fourth bit of the register CONT are 100, the output signals for the portion of one cycle are generated from the waveform data of 120-degree portion. At this time, in the register CNT 12, the count-up number is set at +4, and the counting action is done sequentially from 0 to 8 by the count-up number of +4. Consequently, the waveform data Da to Dc for the portion of 120 degrees are read out three times in one cycle from angles $\theta$c1 to $\theta$c3 in FIG. 10. Therefore, the numerical value of the register CNT 12 is always even, and since the zero-th bit is 0, the multiplexer 27 first leads out the initial data F stored in the register STRT. As a result, the initial value of the address signal generation circuit 24 becomes the initial data F stored in the register STRT. By the signal from the decoder 29, the address signal generation circuit 24 functions as the up-counter, and the address values are sequentially specified while increasing. At this time, the multiplexer 27 changes over to read out the register END, and the address data from the address signal generation circuit 24 and the initial data F stored in the register END are compared in the coincidence judging circuit 26. In this case, when the addresses are specified for the portion of 64 times for time division at the each angle $\theta$c1 to $\theta$c3, for example, by the address signal generation circuit 24, the output of the coincidence judging circuit 26 is changed to, for example, a high level.

Thus, data conversion by the data conversion circuit 30 is performed to the waveform data Da to Dc delivered from the ROM 28. That is, from the decoder 29, the data of the third bit through the zero-th bit of the register CNT 12 are read out, and the data is converted accordingly as mentioned above. The conversion modes in the data conversion circuit 30 are shown in Table 9.

TABLE 9

| Angle | $\theta$c1 | $\theta$c2 | $\theta$c3 |
|---|---|---|---|
| Address specifying direction | Normal | Normal | Normal |
| Waveform data | | | |
| Ea | Da | Dc | Db |
| Eb | Db | Da | Dc |
| Ec | Dc | Db | Da |
| CNT12 | 0h | 4h | 8h |

For example, at angle $\theta$c1, since the value stored in the register CNT 12 is 0, the waveform data Da to Dc are directly delivered as waveform data Ea to Ec. The waveform data $\overline{Ea}$ to $\overline{Ec}$ are inverted forms of the waveform data Ea to Ec, respectively. At angle $\theta$c2, the value of the register CNT 12 is 4, and the waveform data Dc is delivered as the waveform data Ea, the waveform data Da as the waveform data Eb, and the waveform data Db as the waveform data Ec.

Thus, at angles $\theta$c1 to $\theta$c3, the data conversion circuit 30 reads out, as shown in Table 9, the waveform data Da to Dc and the waveform data $\overline{Da}$ to $\overline{Dc}$, as the waveform data Ea to Ec and the waveform data $\overline{Ea}$ to $\overline{Ec}$ in different modes according to the data from the decoder 29.

In this way, by the data conversion circuit 30, the waveform data Ea to Ec, $\overline{Ea}$ to $\overline{Ec}$ for the portion of one cycle are created by the data conversion from the waveform data Da to Dc for the portion of 120 degrees.

Figure 10:
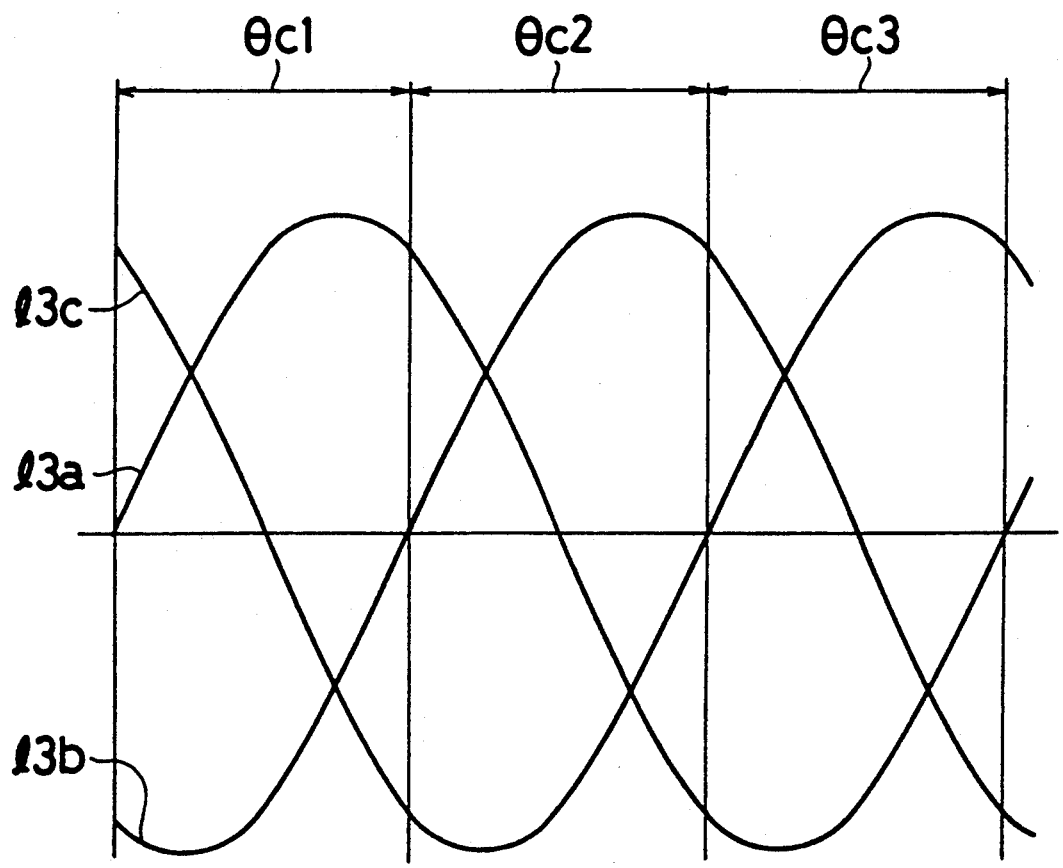
FIG. 10 is a waveform diagram of three-phase alternating current for explaining the conversion action of signal for generating signals for the portion of one cycle from the waveform data of 120-degree portion.

Therefore, in the coils 42a to 42c of the compressor 42 operated by the waveform data Ea to Ec, a voltage drop close to the sine waves 13a to 13c composing the three-phase alternating current shown in FIG. 10 is generated. In FIG. 10, meanwhile, the sine waves 13a to 13c individually correspond to the waveform data Ea to Ec.

(d) When the fourth bit of register CONT is 1 (when the waveform data of 90-degree portion is stored in ROM 28):

When the fourth bit of the register CONT is 1, the output signals for the portion of one cycle are generated from the waveform data for the portion of arbitrary angle. In the case of generation of the output signals for one cycle from the waveform data of 90-degree portion, the operation is described below while referring to FIG. 11. At this time, in the register CNT 12, the numerical value as shown in Table 10 are set in each angle $\theta$d1 to $\theta$d4. When the numerical value of the register CNT 12 is even, that is, when the zero-th bit is 0, the multiplexer 27 first leads out the initial data F stored in the register STRT. As a result, the initial value of the address signal generation circuit 24 becomes the initial data F to be stored in the register STRT. The address signal generation circuit 24 functions as the up-counter by the signal from the decoder 29, and the address values are sequentially specified while increasing. At this time, the multiplexer 27 changes over to lead out the initial data F of the register END, and in the coincidence judging circuit 26 the address data from the address signal generation circuit 24 and the initial data F stored in the register END are compared. In this case, when the addresses are specified for a specific number of times by the address signal generation circuit 24 (for example, 48 times for time division at the each angle $\theta$d1 to $\theta$d4), the output of the coincidence judging circuit 26 becomes, for example, high level.

When the zero-th bit of the register CNT 12 is 1, the multiplexer 27 first reads out the initial data F stored in the register END to the address signal generation circuit 24. In this case, by the control signal from the decoder 29, the address signal generation circuit 24 functions as the down-counter. When the addresses are specified for 48 times by the address signal generation circuit 24, the initial data F of the register STRT changed over and led out from the multiplexer 27 and the address data from the address signal generation circuit 24 are matched, and the output of the coincidence judging circuit 26 becomes high.

Thus, data conversion is executed on the waveform data Da to Dc delivered from the ROM 28 by the data conversion circuit 30. That is, from the decoder 29, the data of the third bit through the zero-th bit of the register CNT 12 are read out, and the data conversion is effected accordingly as mentioned above. The conversion modes in the data conversion circuit 30 are as shown in Table 10.

TABLE 10

| Angle | θd1 | θd2 | θd3 | θd4 |
|---|---|---|---|---|
| Address specifying direction | Normal | Reverse | Normal | Reverse |
| Waveform data | | | | |
| Ea | Da | Da | $\overline{Da}$ | $\overline{Da}$ |
| Eb | Db | Dc | $\overline{Db}$ | $\overline{Dc}$ |
| Ec | Dc | Db | $\overline{Dc}$ | $\overline{Db}$ |
| CNT12 | 0h | 5h | 6h | Bh |

For example, at angle θd1, since the value stored in the register CNT 12 is 0, the waveform data Da to Dc are directly delivered as waveform data Ea to Ec. The waveform data $\overline{Ea}$ to $\overline{Ec}$ are inverted forms of the waveform data Ea to Ec, respectively. At angle θd2, since the value of the register CNT 12 is 5, the waveform data Da is delivered as the waveform data Ea, the waveform data Dc as the waveform data Eb, and the waveform data Db as the waveform data Ec.

Thus, at angles θd1 to θd4, as shown in Table 10, the data conversion circuit 30 leads out the waveform data Da to Dc and the waveform data $\overline{Da}$ to $\overline{Dc}$ as the waveform data Ea to Ec and the waveform data $\overline{Ea}$ to $\overline{Ec}$ in different forms depending on the data from the decoder 29.

Thus, by the data conversion circuit 30, the waveform data Ea to Ec, $\overline{Ea}$ to $\overline{Ec}$ for the portion of one cycle are generated by the data conversion from the waveform data Da to Dc for the portion of 90 degrees.

Figure 11:
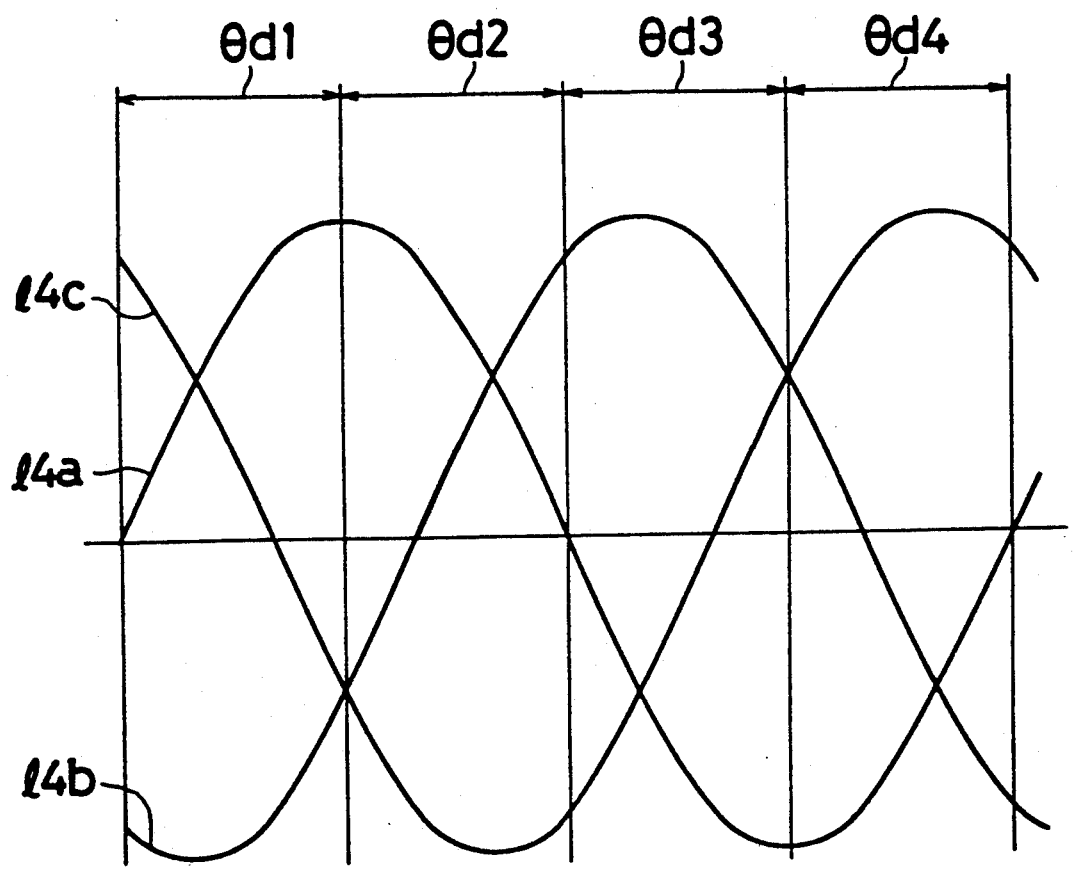
FIG. 11 is a waveform diagram of three-phase alternating current for explaining the conversion action of signal for generating signals for the portion of one cycle from the waveform data of 90-degree portion.

Therefore, at the coils 42a to 42c of the compressor 42 operated by the waveform data Ea to Ec, a voltage drop close to the sine waves 14a to 14c composing the three-phase alternating current shown in FIG. 11 is generated. In FIG. 11, meanwhile, the sine waves 1ra to 14c individually correspond to the waveform data Ea to Ec.

(e) When the fourth bit of register CONT is 1 (when the waveform data of 180-degree portion is stored in the ROM 28):

The case of generation of the output signals for the portion of one cycle from the waveform data for the portion of 180 degrees when the fourth bit of the register CONT is 1 is explained below while referring to FIG. 12. At this time, the numerical value as shown in Table 11 is set in the register CNT 12 at each angle θe1, θe2. The numerical value of the register CNT 12 is always even, and the zero-th bit is 0, and therefore the multiplexer 27 first leads out the initial data F stored in the register STRT. As a result, the initial value of the address signal generation circuit 24 becomes the initial data F stored in the register STRT. The address signal generation circuit 24 functions as the up-counter by the signal from the decoder 29, and the address values are sequentially specified while increasing. At this time, the multiplexer 27 is changed over to read out the initial data F of the register END, and in the coincidence judging circuit 26, the address data from the address signal generation circuit 24 and the initial data F stored in the register END are compared. In this case, when the addresses are specified for a specific number of times by the address signal generation circuit 24 (for example, 96 times for time division at the each angle θe1, θe2), the output of the coincidence judging circuit 26 is changed, for example, to a high level.

Thus, data conversion is executed by the data conversion circuit 30 on the waveform data Da to Dc delivered from the ROM 28. That is, from the decoder 29, the data of the third bit through the zero-th bit of the register CNT 12 are read out, and the data conversion is carried out accordingly as mentioned above. The conversion modes in the data conversion circuit 30 are as shown in Table 11.

TABLE 11

| Angle | θe1 | θe2 |
|---|---|---|
| Address specifying direction | Normal | Normal |
| Waveform data | | |
| Ea | Da | $\overline{Da}$ |
| Eb | Db | $\overline{Db}$ |
| Ec | Dc | $\overline{Dc}$ |
| CNT12 | 0h | 6h |

That is, at angle θe1, since the value stored in the register CNT 12 is 0, the waveform data Da to Dc are directly delivered as waveform data Ea to Ec. The waveform data $\overline{Ea}$ to $\overline{Ec}$ are inverted forms of the waveform data Ea to Ec, respectively. At angle θe2, since the value of the register CNT 12 is 6, the waveform data $\overline{Da}$ is delivered as the waveform data Ea, the waveform data $\overline{Db}$ as the waveform data Eb, and the waveform data $\overline{Dc}$ as the waveform data Ec.

In this way, at each angle θe1, θe2, as shown in Table 11, the data conversion circuit 30 reads out the waveform data Da to Dc and the waveform data $\overline{Da}$ to $\overline{Dc}$ as the waveform data Ea to Ec and the waveform data $\overline{Ea}$ to $\overline{Ec}$ in different modes according to the data from the decoder 29.

Consequently, the waveform data Ea to Ec, $\overline{Ea}$ to $\overline{Ec}$ for the portion of one cycle are generated by the data conversion from the waveform data Da to Dc for the portion of 180 degrees by the data conversion circuit 30.

Figure 12:
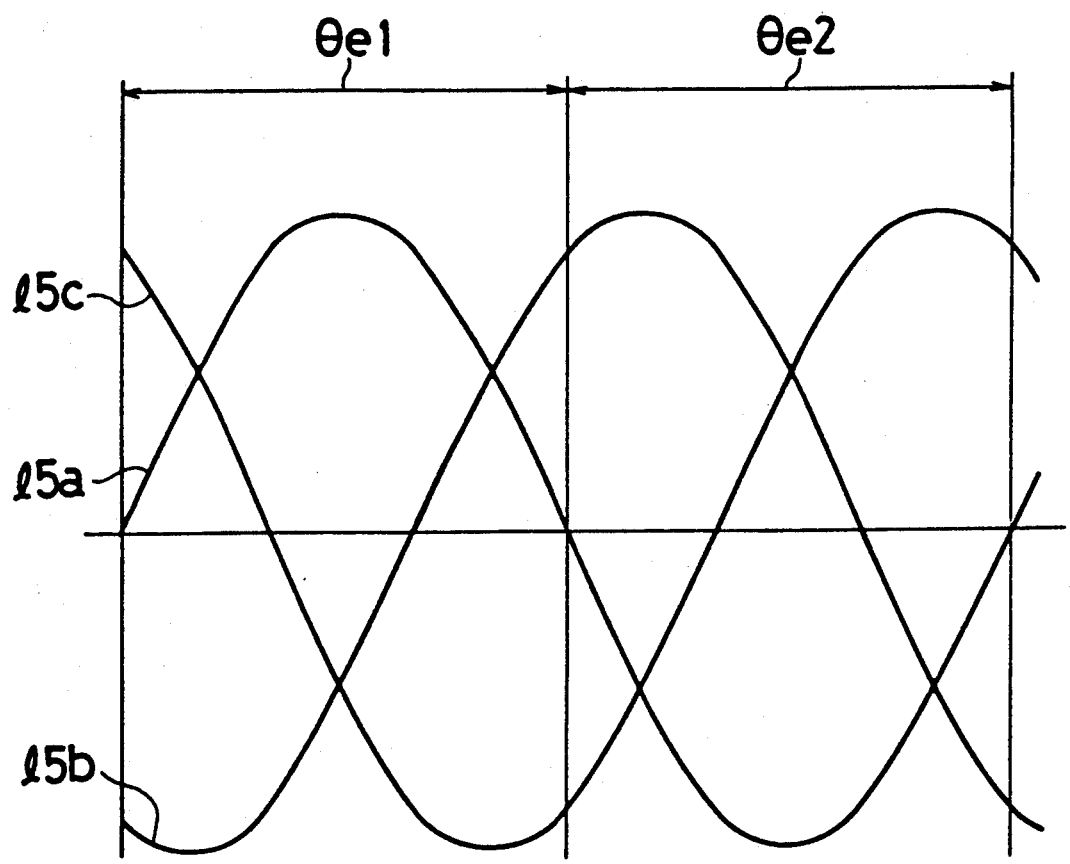
FIG. 12 is a waveform diagram of three-phase alternating current for explaining the conversion action of signal for generating signals for the portion of one cycle from the waveform data of 180-degree portion.

Therefore, at the coils 42a to 42c of the compressor 42 operated according to the waveform data Ea to Ec, a voltage drop close to the sine waves 15a to 15c composing the three-phase alternating current shown in FIG. 12 is generated. In FIG. 12, the sine waves 15a to 15c individually correspond to the waveform data Ea to Ec.

(4) Delay action

Figure 13:
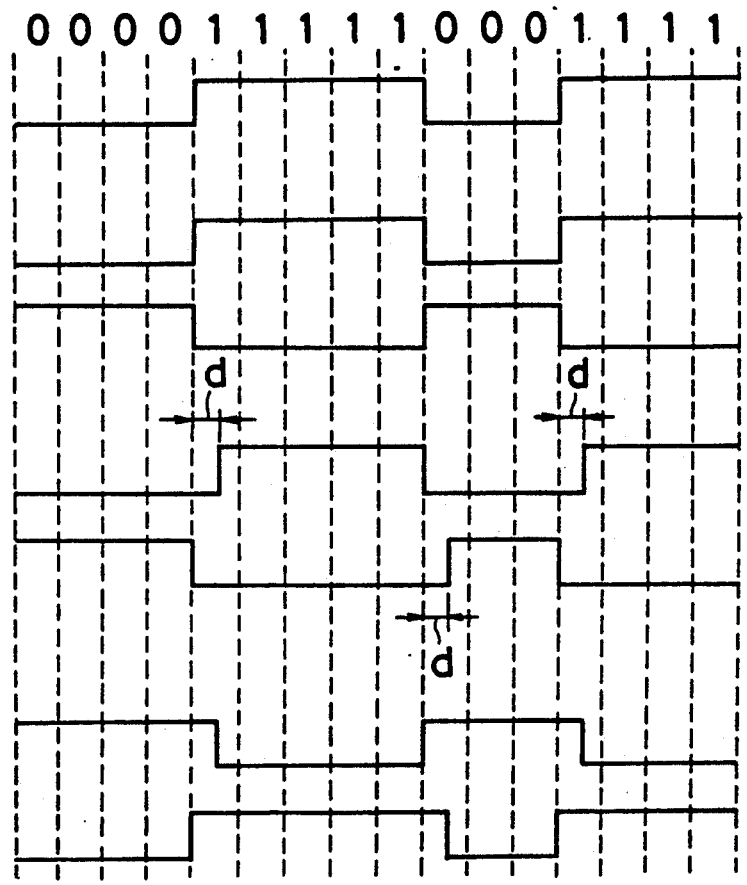
FIG. 13(1) through 13(7) are waveform diagram for explaining the delay action in a rise delay circuit 31.

As mentioned above, the converted waveform data Ea to Ec, $\overline{Ea}$ to $\overline{Ec}$ are delayed in their rise by the delay time d by the delay circuit 31. The reason why the delay is needed in such output signal is that the both transistors Tr1, Tr2 are temporarily in conductive state when inverted signals are applied mutually to the bases of the transistors Tr1, Tr2, for example, because the turn-off time is late in the power transistors Tr1 to Tr6. As a result, an excessive current may flow through the transistors Tr1, Tr2. To avoid such situation, the rise delay circuit 31 delays the rise of the waveform data Ea to Ec, $\overline{Ea}$ to $\overline{Ec}$. That is, as shown in FIG. 13 (1), when the waveform data Da (the waveform data Da in Table 3) is delivered to the data conversion circuit 30, in the case that the numerical value of the register CNT 12 is 0, the waveform data Ea and the waveform data $\overline{Ea}$ as shown in FIG. 13 (2) and FIG. 13 (3) are delivered from the data conversion circuit 30.

The waveform data Ea and the waveform data $\overline{Ea}$ are delayed by the delay time d in their rise by the rise delay circuit 31. The output signal Fa and the output signal $\overline{Fa}$ from the rise delay circuit 31 are as shown in FIG. 13 (4) and FIG. 13 (5), respectively.

Meanwhile, the output signals Fa to Fc, $\overline{Fa}$ to $\overline{Fc}$ from the rise delay circuit 31 are delivered by the suction current of 20 mA from an output circuit 32. Therefore, inverted signals are delivered from the output terminals T1 to T6. The control signals Pa, $\overline{Pa}$ delivered from the output terminals T1, T2 are as shown in FIG. 13 (6) and FIG. 13 (7), respectively. These control signals Pa, $\overline{Pa}$ are inverted through the photocouplers 40 to become output signals R1, $\overline{R1}$. Therefore, the output signals R1, $\overline{R1}$ respectively correspond to the output signals Fa, $\overline{Fa}$ shown in FIG. 13 (4) and FIG. 13 (5), so that simultaneous conduction of the transistors Tr1, Tr2 is avoided.

In the signal generation circuit 21, the third bit through the zero-th bit of the register CONT are provided in order to set the delay time d. The relation between the delay time d and the values of the third through zero-th bit of the register CONT is as shown in Table 12.

TABLE 12

| Register CONT | | | | Delay time |
|---|---|---|---|---|
| 3rd bit | 2nd bit | 1st bit | zero-th bit | (μsec) |
| 0 | 0 | 0 | 0 | 0 |
| 0 | 0 | 0 | 1 | 2 |
| 0 | 0 | 1 | 0 | 4 |
| 0 | 0 | 1 | 1 | 6 |
| 0 | 1 | 0 | 0 | 8 |
| 0 | 1 | 0 | 1 | 10 |
| 0 | 1 | 1 | 0 | 12 |
| 0 | 1 | 1 | 1 | 14 |
| 1 | 0 | 0 | 0 | 16 |
| 1 | 0 | 0 | 1 | 18 |
| 1 | 0 | 1 | 0 | 20 |
| 1 | 0 | 1 | 1 | 22 |
| 1 | 1 | 0 | 0 | 24 |
| 1 | 1 | 0 | 1 | 26 |
| 1 | 1 | 1 | 0 | 28 |
| 1 | 1 | 1 | 1 | 30 |

Thus, in this embodiment, depending on the type of the power transistors Tr1 to Tr6 being used, a desired delay time may be selected.

The control signals Pa to Pc, $\overline{Pa}$ to $\overline{Pc}$ thus delivered from the terminals T1 to T6 are applied to the power transistors Tr1 to Tr6 through the photocouplers 40, and the applied voltage to the compressor 42 is controlled, so that the rotation in the compressor 42 is controlled.

In this embodiment, as described herein, the conversion of the specified data of the address is conducted by the hardware on the basis of the initial data F stored in each register. It is therefore unnecessary to prepare a program for such specification of address or conversion of data, and the programming load will be notably alleviated. Still more, since the command cycle time of the CPU 34 does not cause changes in the waveform by depending on the length of the subroutine of the program, signals of high precision can be delivered. It is hence possible to process the signals as desired, for example, to set the delay time d precisely at the optimum value.

Figure 14:
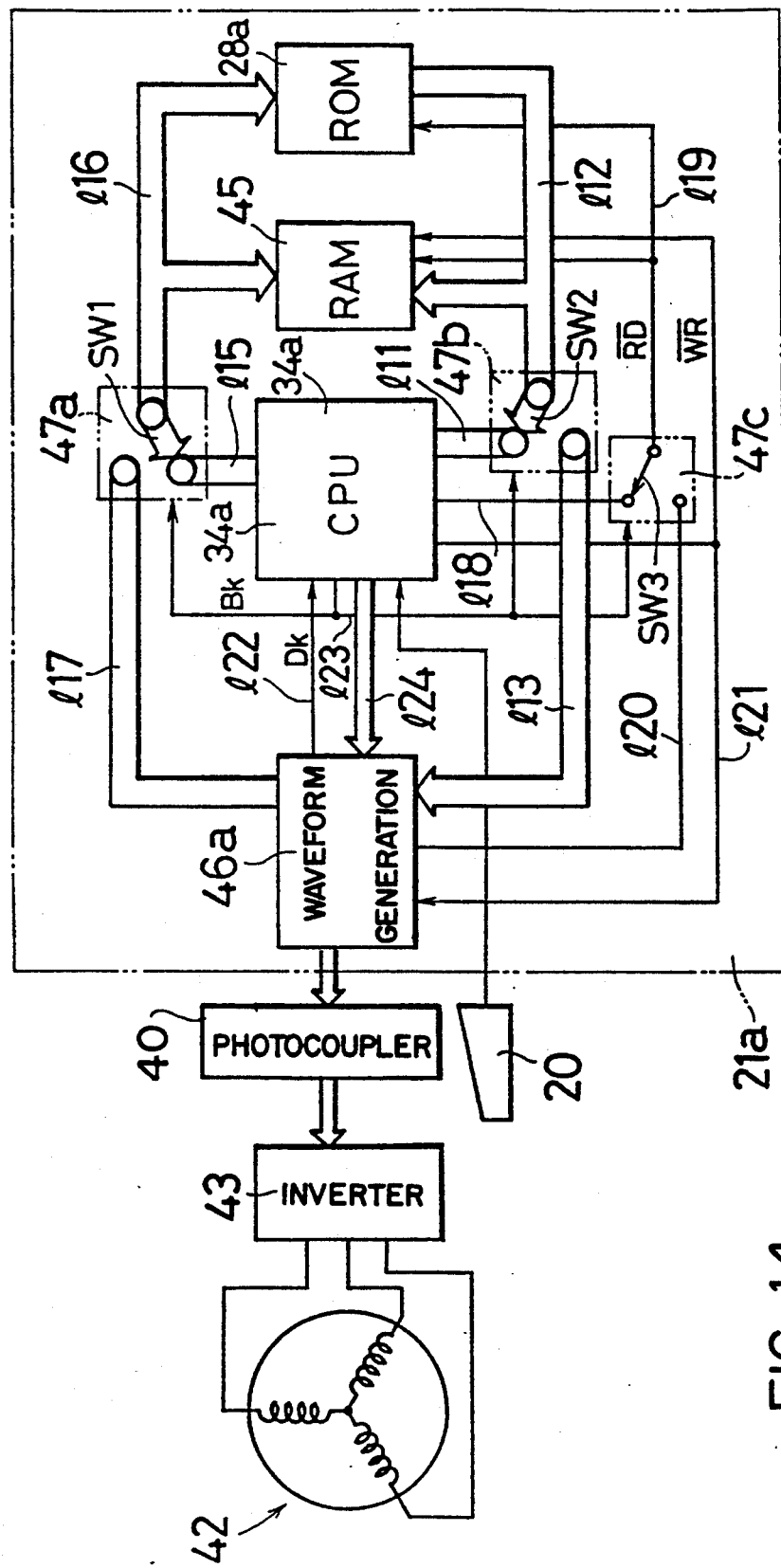
FIG. 14 is a block diagram showing a simplified diagram of a signal generation circuit 21a as a second embodiment of the invention.

FIG. 14 is a block diagram showing a simplified composition of a signal generation circuit 21a as a second embodiment of the invention. In FIG. 14, the parts the same as or equivalent to those shown in FIG. 2 are identified with the same reference numbers. Referring now to FIG. 14, the composition of the signal generation circuit 21a is described below.

The signal generation circuit 21a comprises a CPU 34a realized by microcomputer or the like, a RAM 45, a ROM 28a, a waveform generation circuit 46a, and line changeover switches 47a, 47b, 47c as changeover means, and the block of the waveform generation circuit 46a contains within itself plural registers, address specifying means 35, and signal processing means 36 as stated below.

In the ROM 28a, the operation program P necessary for the operation of the CPU 34, and the waveform data relating to the three-phase alternating-current waveform to be applied to the compressor 42 are stored in a predetermined region. In the RAM 45, the rotating speed of the motor set by an external controller 20 or the like, the temperature information from the temperature sensor and other data are written. In this embodiment, by installing the line changeover switches 47a to 47c, when specifying necessary addresses and transferring program data between the CPU 34a and the ROM 28a, the changeover contact pieces SW1 to SW3 of the line changeover switches 47a to 47c are set at the CPU 34a side, and bus lines 115, 116 for address data and bus lines 111, 112 for program data, and control buses 118, 119 for reading out are respectively connected. The CPU 34a controls the other blocks by, for example, setting the initial data F in the register for composing the waveform generation circuit 46a through bus line 124, according to the operation program P being read in.

On the other hand, when requesting reading of waveform data from the ROM 28a, a changeover request signal Dk is delivered from the waveform generation circuit 46a to the CPU 34a through line 122, and at the CPU 34a, depending on the changeover request signal Dk, a bus changeover signal Bk is delivered through line 123, and the changeover contact pieces SW1 to SW3 of the line changeover switches 47a to 47c are changed to the waveform generation circuit 46 side. As a result, the bus lines 112, 113 for waveform data, bus lines 116, 117 for address data, and control buses 119, 120 for reading out are mutually connected. The waveform generation circuit 46a in which the initial data F is set is not related with the CPU 34a, and therefore when transferring address data from the waveform generation circuit 46a to the RAM 45 and the ROM 28a and reading out the data of the RAM 45 and the waveform data of ROM 28a, it is not necessary to connect the bus lines for the address data and for the waveform data to the CPU 34a.

That is, the CPU 34a is in a waiting state. Thus, the waveform generation circuit 46a delivers a read command $\overline{RD}$, and the necessary address specification and the transfer of waveform data are executed between the waveform generation circuit 46a and the ROM 28a. When the waveform data is stored in the waveform generation circuit 46a, the changeover contact pieces SW1 to SW3 of the line changeover switches 47a to 47c are reset to the CPU 34a side, and thereafter the CPU 34a executes the interrupted operation program. Meanwhile, control bus 121 for writing is always connected to the CPU 34a, the waveform generation circuit 46a and the RAM 45.

Figure 4:
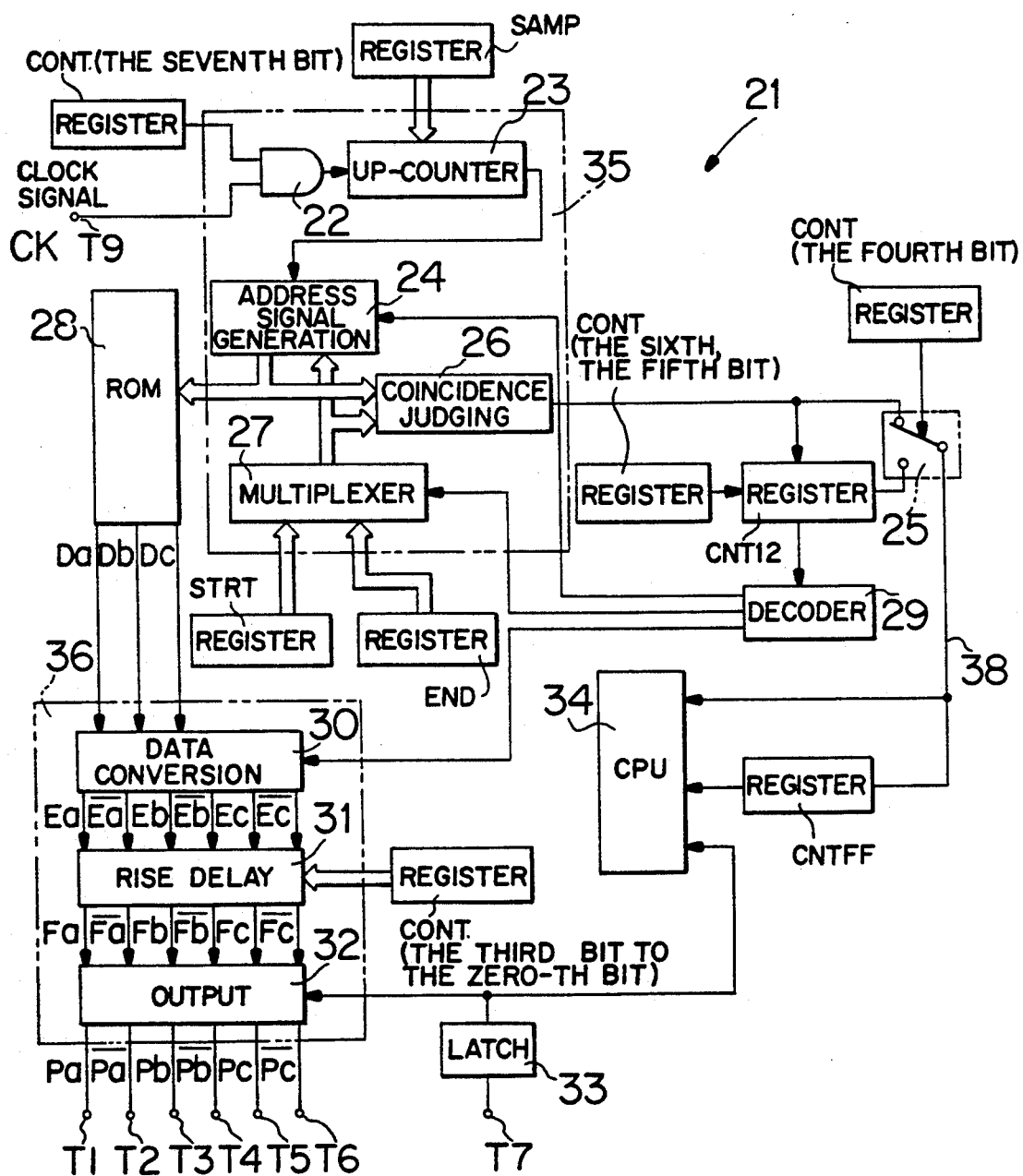
FIG. 4 is a block diagram showing a practical structure of the signal generation circuit 21.
Figure 15:
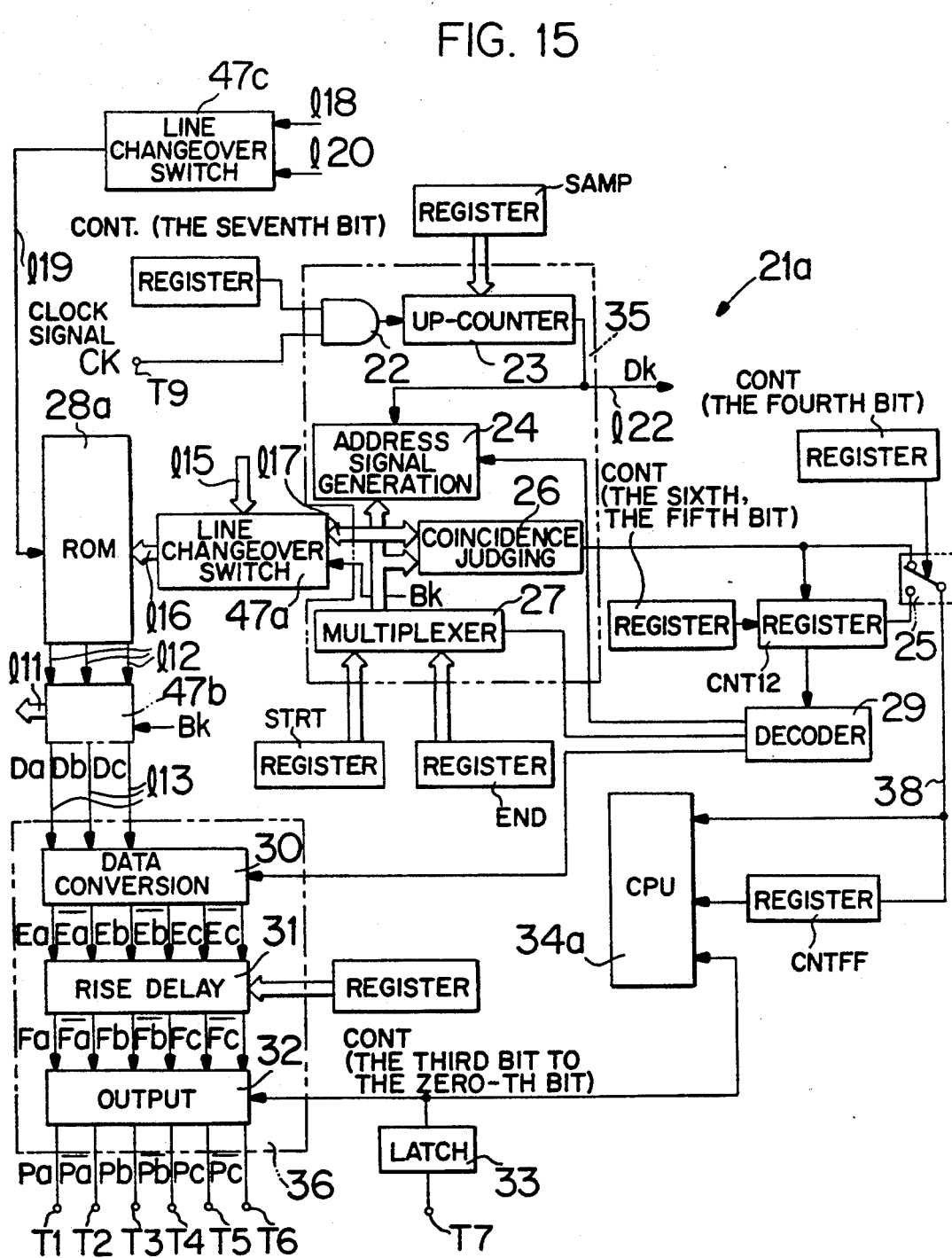

FIG. 15 is a practical structure showing the signal generation circuit 21a, similar to the signal generation circuit 21 in FIG. 4. In FIG. 15, the same or equivalent parts as in FIG. 4 are identified with same reference numbers. Relating to the input, output bus lines from the ROM 28a, the line changeover switches 47a to 47c are provided. When the changeover contact pieces SW1 to SW3 of the line changeover switches 47a to 47c are set to the waveform generation circuit 46a side by the bus changeover signal Bk from the CPU 34a (see FIG. 14), the address data delivered from the address signal generation circuit 24 is fed to the ROM 28a, so that the waveform data Da, Db, Dc of the specified addresses are delivered to the signal processing means 36. On the other hand, when the changeover contact pieces SW1 to SW3 are set to the CPU 34a side, the operation program P is read out to the ROM 28a by the address specification from the CPU 34a.

The changeover timing of the line changeover switches 47a to 47c, that is, the timing of the output of the bus changeover signal Bk is when the address signal generation circuit 24 generates the address data. Therefore, the signal becoming high when the up-counter 24 overflows, coinciding with the time of generation of the address data, is given to the CPU 34a as the changeover request signal Dk. In the CPU 34a, responding to the signal Dk, the bus changeover signal Bk is delivered through the line 123 shown in FIG. 14, and the changeover contact pieces SW1 to SW3 of the line changeover switches 47a to 47c are changed to the waveform generation circuit 46a side, and the specification of address data and the transfer of waveform data to the ROM 28a are executed as mentioned above.

Figure 5:
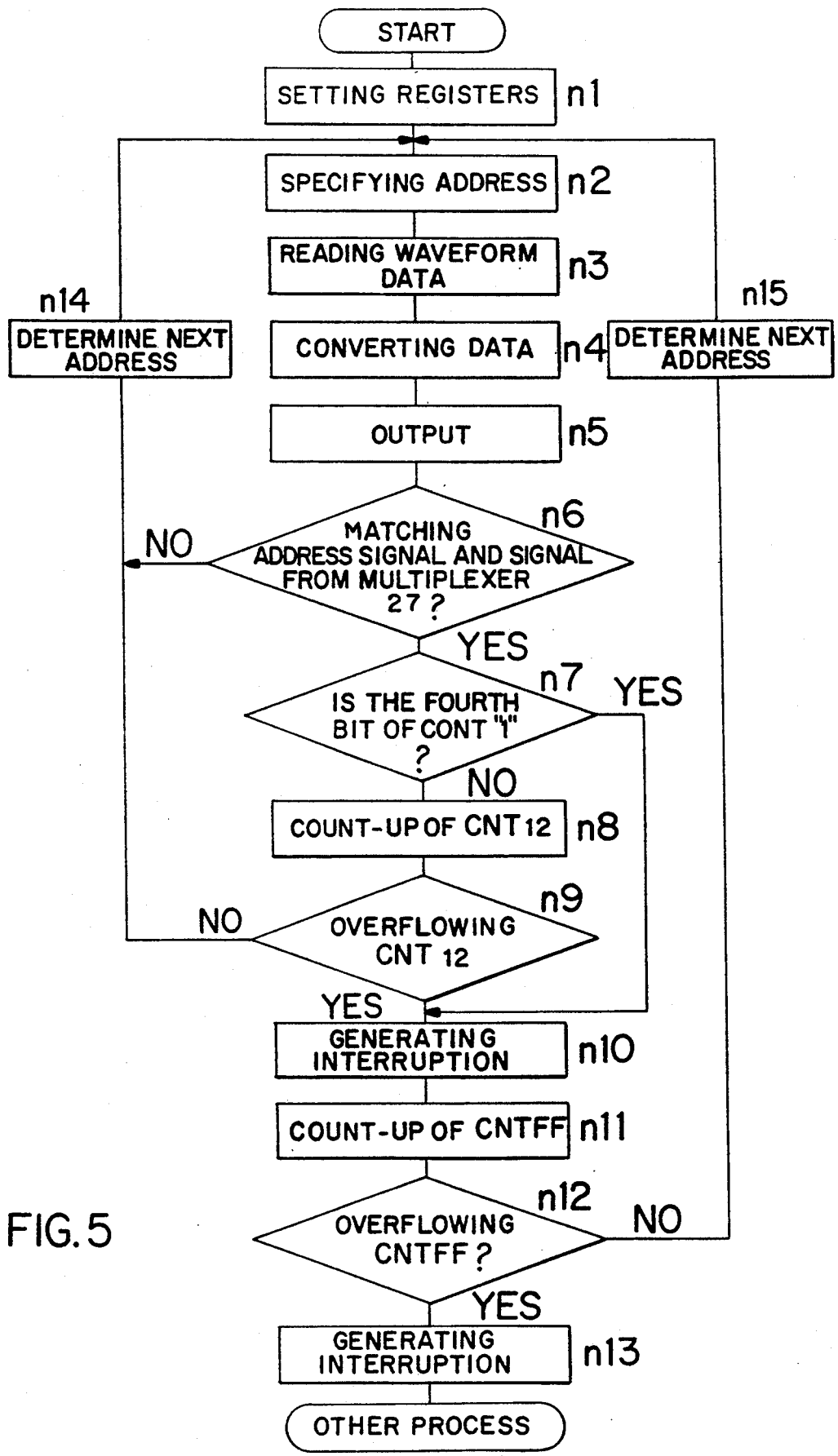
FIG. 5 is a flowchart for explaining the operation of the signal generation circuit 21.

The changeover timing of the line changeover switches 47a to 47c is shown by referring to the flowchart shown in FIG. 5, in which, at step n2, when the address is specified in the ROM 28a by the address specifying means 35, the changeover contact pieces SW1 to SW3 are set to the waveform generation circuit 46a side by the bus changeover signal Bk, and, at step n3, when the waveform data is delivered from the ROM 28a, those are set at the CPU 34a side.

Meanwhile, the operation and timing in other blocks are same as in the first embodiment.

In this way, the waveform generation circuit 46a can directly read in the waveform data which has been read out by directly specifying the address to the ROM 28a, in other words, the waveform data can be read directly without resort to the CPU 34a by the direct memory access (DMA) transfer system, and therefore it is not necessary to write the program for reading out the waveform data in the ROM 28a, and the program for processing the waveform data is not needed. As a result, the load in programming is strikingly alleviated, and the waveform data can be read out at high speed, so that the response of the control can be dramatically enhanced.

Furthermore, as mentioned above, according to this embodiment, depending on the timing of reading out the operation program in the CPU 34a and the timing of reading out the waveform data in the waveform generation circuit 46a, it is composed so as to change over the bus line from the memory to the CPU 34a and to waveform generation circuit 46a, and it is free from the problem of data bus occupation when reading out the data even if different types of data are stored in the common ROM 28a. In other words, it is possible to store the operation program P and waveform data in one memory, that is, the ROM 28a.

Meanwhile, in the constitution of the signal generation circuit 21, at least two memories are individually needed, that is, the ROM 50 exclusive for the operation program relating to the CPU 34, and the ROM 28 exclusive of the waveform data relating to the waveform generation circuit 46.

Figure 16:
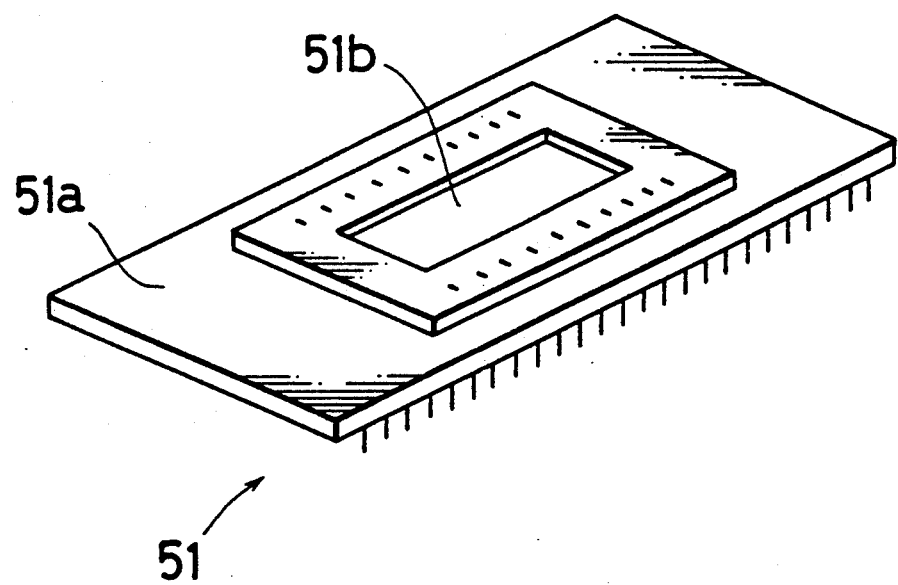
FIG. 16 is a perspective view showing the structure of a piggy-back 51 used in preparation of program in EPROM in the development stage.

On the other hand, in the development stage of the system using microcomputer, it is a general technique to replace the ROMs for composing the system with erasable programmable ROM (EPROM) and create the program by trial and error, and for this purpose a piggy back 51 as shown in FIG. 16 is used. The piggy back 51 is a tool for completing a final program while rewriting the application program freely as many times as required, by mounting a socket 51b for EPROM on a package 51a comprising a microcomputer, and mounting the EPROM on the socket 51b. Besides, mounting of the parts can be checked by using the piggy back 51.

Therefore, when the necessary program is created in the signal generation circuit 21 by using such piggy back 51, at least two sockets 51b must be mounted on the package 51a, which is, however, difficult considering the space of the package 51a. It accordingly requires labor for writing and reviewing the operation program in one EPROM and writing and reviewing the waveform data in the other EPROM, which may result in increased time and labor cost for programming.

Therefore, in the signal generation circuit 21a in the second embodiment, considering these points, it is designed to change over the data transfer between the memory and CPU and between the memory and waveform generation circuit, depending on the timing of reading out the data to be transferred, by the line changeover switches. As a result, while solving the problem of occupancy of data bus, the waveform data and the operation program can be stored in a same memory. Thus, the space occupation rate by the piggy back in the development stage of the signal generation circuit can be lessened, so that the load can be alleviated significantly in the step of creation of program and data.

In this embodiment, the setting of the data conversion modes and the delay time d is effected by the operation program of the CPU 34 depending on the type of the data stored in the ROM 28. However, it may be also possible to design to set the data conversion modes and the delay time d by giving command codes or the like to the CPU 34 through, for example, general-purpose ports or the like.

The foregoing embodiments relate to the composition of driving the motor, which, however, is not limitative.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A signal generation circuit comprising:
   memory means for storing waveform data used to generate an output signal;
   central processing means for storing initial data in at least one register for addressing the waveform data, aid central processing means and the register being operatively connected by a data bus;

address specifying means for specifying an address in said memory means for the waveform data on the basis of the initial data stored in the register; and signal processing means for processing the waveform data at the specified address on the basis of the initial data stored in the register to produce the output signal;

said at least one register including, a start/end register for storing one of a start address and an end address of the initial data, a sample time setting register for storing the time interval for reading out the waveform data from the memory, a control register for storing a type of waveform data, and plural counter registers for counting and storing the number of times the waveform data is read from memory.

2. A signal generation circuit as claimed in claim 1, said central processing circuit comprising central processing memory means for storing an operational program for processing and outputting the initial data to the register.

3. A signal generation circuit comprising:

central processing means for processing an output signal according to an operation program;

at least one register connected to the central processing means through a data bus, for storing initial data as a reference for the output signal;

memory means for storing the operation program and waveform data necessary to generate the output signal;

address specifying means for specifying an address of the waveform data stored in the memory means according to the initial data stored in the register;

signal processing means for processing the waveform data at the specified address on the basis of the initial data stored in the register in order to provide the output signal; and switching means for switching the data bus so that it electrically connects the central processing means and the memory means when an instruction from the operational program is to be read from the memory means into the central processing means, and so that the data bus electrically connects the signal processing means and the memory means when the waveform data is to be read from the memory means into the signal processing means.

4. A signal generation circuit as claimed in claim 1 or 3, wherein the waveform data is stored in the memory based on a frequency of the output signals to be generated, and the waveform data is selected according to the initial data stored in the register.

5. A signal generation circuit as claimed in claim 1 or 3, further comprising:

a direct-current power source for generating direct-current electric power; and inverting means for converting the direct-current electric power from the direct-current power source into alternating-current electric power, in accordance with the output signal produced by the signal processing means.

6. A signal generation circuit as claimed in claim 3, wherein the switching means switches the data bus from electrically connecting the central processing circuit and the memory, to electrically connecting the signal processing means and the memory, in response to a bus switching signal from the central processing means.

7. A signal generation circuit as claimed in claim 6, wherein the central processing means detects a time interval for specifying the address of the waveform data by the address specifying means, and generates the bus switching signal in response to the time interval so that the waveform data and operational program can be stored in said memory means.

8. A compressor controlling device comprising:

signal generation means including, first read only memory for storing an operational program, second read only memory for storing waveform data corresponding to a plurality of motor rotation speeds, central processing means for addressing the operational program stored in said first read only memory and for addressing waveform data stored in said second read only memory, random access memory for receiving and outputting a rotational speed from an external controller, and waveform generating means for processing the waveform data addressed by said CPU in accordance with the operational program to generate a compressor control signal;

photocoupling means for removing noise from a direct-current output;

converting means for converting the direct-current output to a rectangular wave equal to a three phase alternating current according to the compressor control signal and the rotational speed stored in random access memory; and compressor coil means for receiving the three phase alternating current for controlling a rotation speed of the compressor.

9. The compressor controlling device of claim 8, said photocoupling means including a plurality of phototransistors and said connecting means including a power supply circuit for supplying the direct current output and a plurality of transistors for converting the direct current output into the three phase alternating current output.

10. A signal generation circuit comprising:

random access memory for storing a rotational speed of a motor set by an external controller;

read only memory for storing an operational program and waveform data;

central processing means for addressing the operational program stored in said read only memory;

waveform generating means for addressing and processing waveform data in accordance with the operational program to generate a compressor control signal used to control a motor such that its rotational speed matches the rotational speed stored in said random access memory; and line changeover means for operatively connecting said random access memory and said read only memory to said central processing means when the operational program is to read from said read only memory and for operatively connecting said random access memory and said read only memory to said waveform generating means when waveform data is to be read from said read only memory.

* * * * *